US012062847B2

(12) United States Patent
Luo et al.

(10) Patent No.: US 12,062,847 B2
(45) Date of Patent: Aug. 13, 2024

(54) ANTENNA, ANTENNA ARRAY, AND COMMUNICATIONS DEVICE

(71) Applicant: Huawei Technologies Co., Ltd., Guangdong (CN)

(72) Inventors: Bing Luo, Chengdu (CN); Jianping Li, Shenzhen (CN); Wenfei Qin, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 143 days.

(21) Appl. No.: 17/687,422

(22) Filed: Mar. 4, 2022

(65) Prior Publication Data

US 2022/0190472 A1 Jun. 16, 2022

Related U.S. Application Data

(63) Continuation of application No. PCT/CN2020/100490, filed on Jul. 6, 2020.

(30) Foreign Application Priority Data

Sep. 5, 2019 (CN) ........................ 201910837849.7

(51) Int. Cl.
*H01Q 1/52* (2006.01)
*H01Q 21/06* (2006.01)
*H01Q 21/30* (2006.01)

(52) U.S. Cl.
CPC ........... *H01Q 1/523* (2013.01); *H01Q 21/062* (2013.01); *H01Q 21/30* (2013.01)

(58) Field of Classification Search
CPC ...... H01Q 1/523; H01Q 21/062; H01Q 21/30; H01Q 1/521; H01Q 5/42; H01Q 9/285;
(Continued)

(56) References Cited

U.S. PATENT DOCUMENTS 9,461,369 B1 10/2016 Liang et al.
2004/0227683 A1* 11/2004 Caimi ..................... H01Q 9/40 343/742

(Continued)

FOREIGN PATENT DOCUMENTS

CN 103259087 A 8/2013
CN 104067527 A 9/2014

(Continued)

OTHER PUBLICATIONS

He Huang et al.,"A Novel Vector Synthetic Dipole Antenna and Its Common Aperture Array", IEEE Transactions on Antennas and Propagation ( vol. 66, Issue: 6, Jun. 2018) ,Mar. 26, 2018 , total:6pages.

(Continued)

*Primary Examiner* — Dimary S Lopez Cruz
*Assistant Examiner* — Austin M Back
(74) *Attorney, Agent, or Firm* — WOMBLE BOND DICKINSON (US) LLP

(57) ABSTRACT

This application discloses an antenna, an antenna array, and a communications device. The antenna includes a radiation part and a feeding part. The feeding part is coupled to the radiation part and is configured to feed power to the radiation part, so that the radiation part radiates a low-frequency signal outward. The radiation part includes one or more frequency selection units with a bandpass characteristic, and the radiation part is a structure that is capable of exciting, when a high-frequency signal passes through, coupling currents. When the high-frequency signal passes through the radiation part, each pair of coupling currents excited on the radiation part appear in pairs and can cancel each other. This can reduce or even completely eliminate a high-frequency induced current with the same frequency as the high-frequency signal on the radiation part.

20 Claims, 24 Drawing Sheets

(58) Field of Classification Search
CPC .......... H01Q 1/246; H01Q 21/24; H01Q 1/38; H01Q 1/22; H01Q 1/50; H01Q 19/104
See application file for complete search history.

(56) References Cited

U.S. PATENT DOCUMENTS

| | | | | |
|---|---|---|---|---|
| 2015/0372395 | A1* | 12/2015 | Lavedas | G01R 33/3642<br>343/855 |
| 2016/0240919 | A1 | 8/2016 | Wu et al. | |
| 2019/0386398 | A1* | 12/2019 | Mahoney | H01Q 13/0258 |

FOREIGN PATENT DOCUMENTS

| | | | | |
|---|---|---|---|---|
| CN | 205900780 | U | | 1/2017 |
| CN | 108183313 | A | | 6/2018 |
| CN | 108232433 | A | | 6/2018 |
| CN | 109004340 | A | | 12/2018 |
| CN | 208862156 | U | * | 5/2019 |
| CN | 208862156 | U | | 5/2019 |
| EP | 3104455 | A1 | | 12/2016 |
| JP | 2019009708 | A | * | 1/2019 |
| JP | 2019009708 | A | | 1/2019 |
| TW | 201931678 | A | | 8/2019 |
| WO | 2019009951 | A1 | | 1/2019 |
| WO | 2019070947 | A1 | | 4/2019 |

OTHER PUBLICATIONS

Xu Weiwei et al.,"Design and Research of A Dual frequency Nested Base Station Antenna", South China University of Technology,Apr. 21, 2015, total:88pages.

* cited by examiner

-Prior Art-

-Prior Art-

-Prior Art-

-Prior Art-

-Prior Art-

ANTENNA, ANTENNA ARRAY, AND COMMUNICATIONS DEVICE

CROSS-REFERENCE TO RELATED APPLICATIONS

This application is a continuation of International Application No. PCT/CN2020/100490, filed on Jul. 6, 2020, which claims priority to Chinese Patent Application No. 201910837849.7, filed on Sep. 5, 2019. The disclosures of the aforementioned applications are hereby incorporated by reference in their entireties.

TECHNICAL FIELD

This application relates to the field of communications technologies, and in particular, to an antenna, an antenna array, and a communications device.

BACKGROUND

In a communications device such as a base station, both a high-frequency antenna and a low-frequency antenna are usually configured. The high-frequency antenna has large signal transmission capacity, and the low-frequency antenna has a strong signal anti-attenuation ability. To reduce a volume of the communications device, sometimes the high-frequency antenna and the low-frequency antenna are configured in a same antenna array to form a common aperture antenna array.

In an existing communications device, a size of a radiation part of a low-frequency antenna is usually larger than that of a high-frequency antenna, a high-frequency radio frequency signal radiated from the high-frequency antenna excites a high-frequency induced current on the radiation part of the low-frequency antenna, and the induced current further excites a high-frequency electromagnetic wave. The high-frequency electromagnetic wave and an electromagnetic wave directly radiated from the high-frequency antenna have a combined effect, resulting in deterioration of pattern parameters such as gain stability and a polarization suppression ratio of the high-frequency antenna.

SUMMARY

This application provides an antenna, an antenna array, and a communications device, to improve pattern parameters such as gain stability and polarization suppression ratios of high-frequency antennas in the antenna array.

According to a first aspect, an antenna is provided. The antenna includes a radiation part and a feeding part. The feeding part is coupled to the radiation part and is configured to feed power to the radiation part, so that the radiation part radiates a low-frequency signal outward. The radiation part includes one or more frequency selection units with a bandpass characteristic, and when a high-frequency signal passes through the radiation part, is a structure that is capable of exciting coupling currents that cancel in pairs. When the high-frequency signal passes through the radiation part, each pair of coupling currents excited on the radiation part appear in pairs and can cancel each other. This can reduce or even completely eliminate a high-frequency induced current with the same frequency as the high-frequency signal on the radiation part. In this way, when the high-frequency signal passes through, the radiation part can only radiate a few or no electromagnetic waves of the same frequency as the high-frequency signal, which helps to improve pattern parameters such as gain stability and a polarization suppression ratio of a high-frequency antenna that emits the high-frequency signal.

In an embodiment, each of the frequency selection units includes a conductive grid and a conductor located in the conductive grid, there is a gap between the conductor and the corresponding conductive grid, and the conductor and the corresponding conductive grid are electrically coupled, so that the corresponding frequency selection unit has the bandpass characteristic. In this way, when the high-frequency signal passes through the radiation part, every two pairs of coupling currents excited by the radiation part are formed in one of the frequency selection units. In each pair of coupling currents, one current is formed in the conductor and the other current is formed in the conductive grid, and the current formed in the conductor and the current formed in the conductive grid can at least partially cancel each other in the far field, and reduce or even completely eliminate electromagnetic waves radiated from the radiation part that have the same frequency as the high-frequency signal.

In an embodiment, the feeding part is coupled to an outer side or outer sides of the conductive grid or conductive grids in one or more frequency selection units, and is configured to feed power to the coupled conductive grid or conductive grids. Compared with the case in which the feeding part feeds power to a shared side frame of the conductive grids of two adjacent frequency selection units, this can increase a bandwidth of the antenna.

In an embodiment, a width of a frame of the conductive grid is greater than or equal to 0.001 times a vacuum wavelength corresponding to a frequency of the high-frequency signal and less than or equal to 0.1 times the vacuum wavelength corresponding to the frequency of the high-frequency signal. On the one hand, this can avoid that when the width of the frame of the conductive grid is too large, an induced current that has the same frequency as the high-frequency signal and cannot be canceled is also excited by the high-frequency signal on an edge of the frame of the conductive grid that is farther from the conductor, resulting in deterioration of parameters such as gain stability and a polarization suppression ratio of the high-frequency antenna that finally emits the high-frequency signal. On the other hand, this can avoid that when the width of the conductive grid is too small, the frame of the conductive grid cannot withstand a relatively large current and a relatively large power, resulting in a small antenna bandwidth, limited capacity, and a poor radiation capability.

In an embodiment, a width of the gap between the conductive grid and the corresponding conductor is greater than or equal to 0.001 times a vacuum wavelength corresponding to a frequency of the high-frequency signal and less than or equal to 0.1 times the vacuum wavelength corresponding to the frequency of the high-frequency signal, to ensure that a distance between the conductor and the frame of the corresponding conductive grid is not too far, and that the induced current in the conductor and the induced current in the corresponding conductive grid can be coupled in pairs and cancel each other.

In an embodiment, the conductor includes a plurality of sub-conductors that are spaced apart, a width of the gap between every two adjacent sub-conductors is greater than or equal to 0.001 times a vacuum wavelength corresponding to a frequency of the high-frequency signal and less than or equal to 0.1 times the vacuum wavelength corresponding to the frequency of the high-frequency signal, to increase a resonant frequency of the frequency selection unit without changing a size of the conductive grid and retain both the frequency of the high-frequency signal and a frequency of the low-frequency signal of the antenna itself. Particularly, when the width of the gap between every two adjacent sub-conductors is greater than or equal to 0.0025 times the vacuum wavelength corresponding to the frequency of the high-frequency signal and less than or equal to 0.05 times the vacuum wavelength corresponding to the frequency of the high-frequency signal, the resonant frequency of the frequency selection unit increases significantly.

In an embodiment, the radiation part may further include a conductor connecting part; in at least some of the sub-conductors, a part of a side of each sub-conductor is electrically connected to a frame of the conductive grid through the conductor connecting part. In this way, the resonant frequency of the frequency selection unit can be reduced without changing other parameters of the conductive grid and the sub-conductor therein. This provides another means for retaining both the frequency of the high-frequency signal and the frequency of the low-frequency signal of the antenna itself. A width of a part connecting the side of the sub-conductor and the conductor connecting part is greater than or equal to 0.001 times the vacuum wavelength corresponding to the frequency of the high-frequency signal and less than or equal to 0.1 times the vacuum wavelength corresponding to the frequency of the high-frequency signal, and the resonant frequency of the frequency selection unit reduces significantly.

In an embodiment, a shape of the conductive grid matches a shape of an outer contour of the corresponding conductor, so that a width of the gap between the conductive grid and the corresponding conductor is even, avoiding that when a width of a gap between an inner edge of the conductive grid and an outer edge of the conductor is uneven, an induced current in the conductive grid corresponding to a narrow gap is relatively strong, and losses are relatively large.

In an embodiment, the antenna may be a ±45° dual polarization dipole antenna. Each conductive grid is of a regular polygon with a quantity of sides greater than or equal to 3, and a degree of each internal angle of the regular polygon is a divisor of 360°, which facilitates arrangement of the radiation part of a planar structure, and allows each radiation part to be symmetric with respect to a horizontal axis, a vertical axis, a +45 degree polarization axis, and a −45 degree polarization axis. For example, in each radiation part, each conductive grid is of a square shape, and one or more conductive grids in each radiation part is/are arranged in an n×n array, where n is a positive integer greater than or equal to 1.

In an embodiment, the antenna further includes a dielectric substrate, and the conductive grid and the conductor are both metal foil structures formed on a surface of the dielectric substrate. During fabrication of the radiation part of the antenna, a metal foil may be deposited on the surface of the dielectric substrate, and then the metal foil may be etched to form the conductive grid in the radiation part and the conductor therein; or patterns of the conductive grid, the conductor, and the like may be printed directly on the surface of the dielectric substrate. In this way, dimensional accuracy and position accuracy of the conductive grid and the conductor and other components therein can be ensured. The dielectric substrate may be a bakelite plate, a glass fiber board, or a plastic plate.

According to a second aspect, an antenna array is provided. The antenna array includes at least one first antenna and at least one second antenna, where the first antenna is the antenna according to the first aspect, and an operating frequency of the second antenna is the frequency of the high-frequency signal, an operating frequency of the first antenna is lower than the operating frequency of the second antenna, and a frequency selection unit in the first antenna has a bandpass characteristic to the operating frequency of the second antenna. During use, the second antenna radiates a signal with the same frequency as the foregoing high-frequency signal. Because the frequency selection unit in the first antenna has the bandpass characteristic to the operating frequency of the second antenna, when the signal radiated from the second antenna passes through a radiation part of the first antenna, currents that are excited at the radiation part of the first antenna by the signal radiated from the second antenna are a pair of coupling currents that can be canceled. This helps to improve pattern parameters such as gain stability and a polarization suppression ratio of the second antenna.

In some embodiments, a minimum distance between the radiation part of the first antenna and at least a part of a radiation part of the second antenna is less than or equal to 0.5 times a vacuum wavelength corresponding to an operating band of the first antenna. This can not only ensure a compact arrangement of the first antenna and the second antenna, but also be less likely to cause deterioration of pattern parameters such as gain stability and a polarization suppression ratio of the second antenna.

According to a third aspect, a communications device is provided. The communications device includes the antenna array according to the technical solution of the second aspect. The radiation part of the first antenna is arranged into a structure that can excite, when a signal radiated from the second antenna passes through, coupling currents that are canceled in pairs. This helps to improve pattern parameters such as gain stability and a polarization suppression ratio of the second antenna.

On a basis of the design provided in the foregoing aspects of this application, a combination may further be made to provide more designs.

DESCRIPTION OF EMBODIMENTS

To make the objectives, technical solutions, and advantages of this application clearer, the following further describes this application in detail with reference to the accompanying drawings. It should be noted that the term “coupled” hereinafter refers to “directly connected or indirectly connected”.

To facilitate understanding of an antenna array provided in an embodiment of this application, the following describes an application scenario of the antenna array. The antenna array provided in this embodiment of this application is applied to a communications device such as a base station. The antenna array includes a high-frequency antenna and a low-frequency antenna that are located in the same antenna array. In a traditional common aperture antenna array, an electromagnetic wave radiated from the high-frequency antenna excites a high-frequency induced current in a radiation part of the low frequency antenna, and the high-frequency induced current and the electromagnetic wave directly radiated from the high-frequency antenna have a combined effect, resulting in deterioration of pattern parameters such as gain stability and a polarization suppression ratio of the high-frequency antenna.

Figure 1:
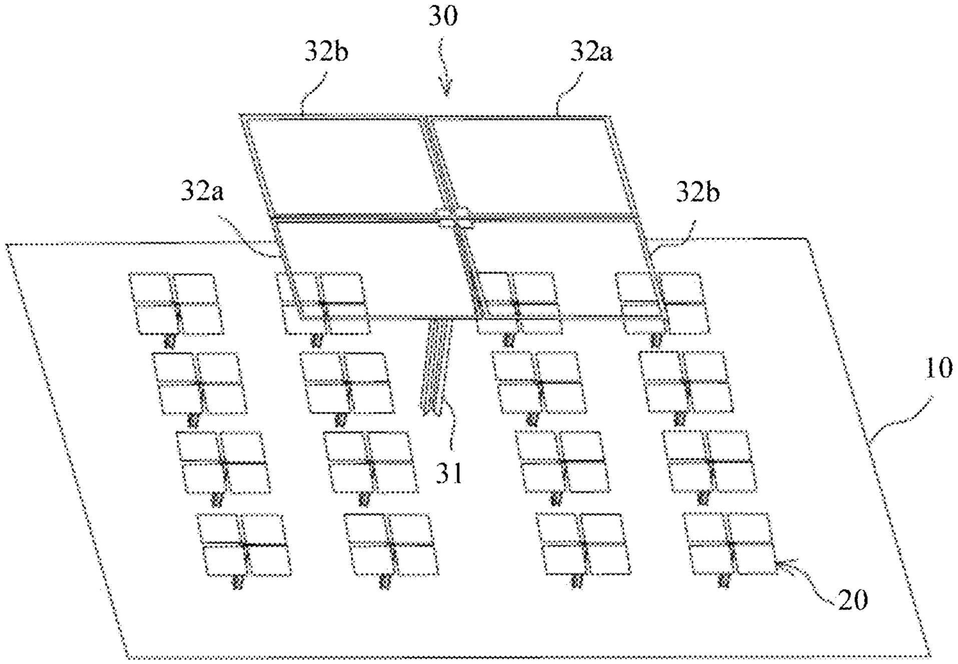
FIG. 1 is a schematic diagram of an antenna array in the prior art.

For example, FIG. 1 is a schematic diagram of an antenna array in the prior art. Referring to FIG. 1, the antenna array includes one low-frequency antenna 30 and a plurality of high-frequency antennas 20 distributed around the low-frequency antenna 30 that are distributed on a metal reflection panel 10. The low-frequency antenna 30 and the high-frequency antennas 20 are all in one antenna array (that is, an area in which the metal reflection panel 10 is located), and form a common aperture antenna array. The low-frequency antenna 30 and the high-frequency antennas 20 are all ±45° dual polarization dipole antennas. The low-frequency antenna 30 includes a +45° polarization antenna and a −45° polarization antenna. The +45° polarization antenna includes two symmetrically arranged first radiators 32*a*, and the −45° polarization antenna includes two symmetrically arranged second radiators 32*b*. The first radiators 32*a* and the second radiators 32*b* are all square metal ring structures. The low-frequency antenna 30 further includes a support leg 31 supporting the first radiator 32*a* and the second radiator 32*b*. An electromagnetic wave radiated from the high-frequency antenna 20 excites a high-frequency induced current in the first radiator 32*a* that flows along the ring structure of the first radiator 32*a*, and excites a high-frequency induced current in the second radiator 32*b* that flows along the ring structure of the second radiator 32*b*. The high-frequency induced currents flowing in the first radiator 32*a* and the second radiator 32*b* excite high-frequency electromagnetic waves radiating to free space. Because the high-frequency electromagnetic waves have the same frequency as the electromagnetic wave directly radiated from the high-frequency antenna 20 itself, this high-frequency electromagnetic waves are canceled or superimposed with the electromagnetic wave directly radiated from the high-frequency antenna 20 itself, resulting in deterioration of parameters such as gain stability and a polarization suppression ratio in a pattern of the high-frequency antenna 20.

Figure 2A:
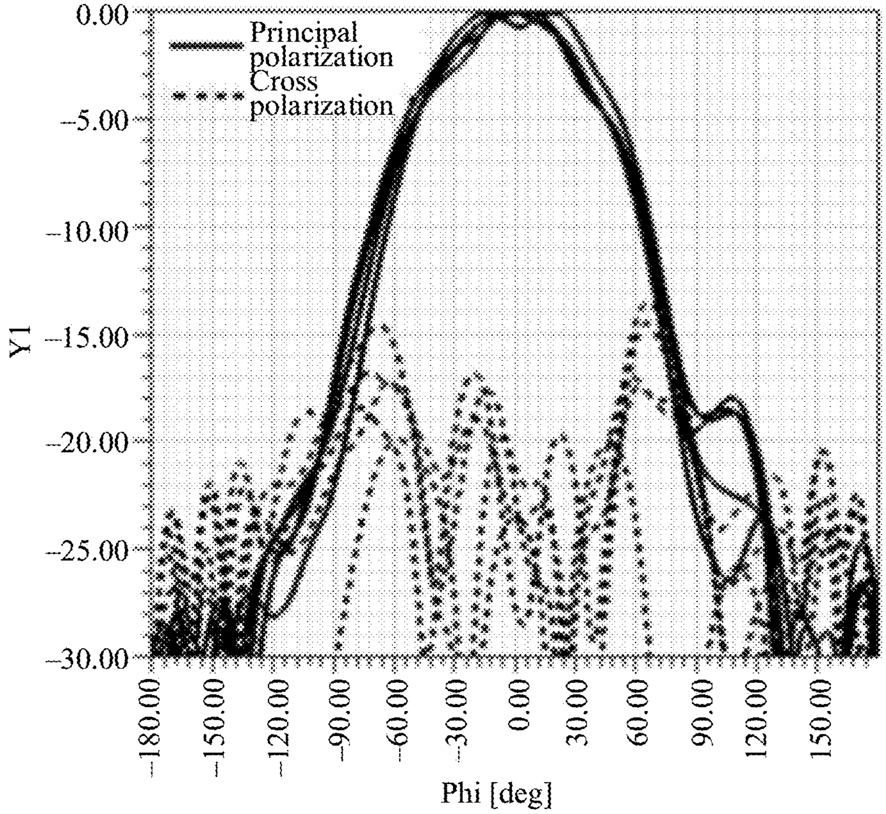
FIG. 2*a* is a +45° polarization pattern of a high-frequency antenna when a low-frequency antenna is not provided in the high-frequency antenna array in FIG. 1.
Figure 2B:
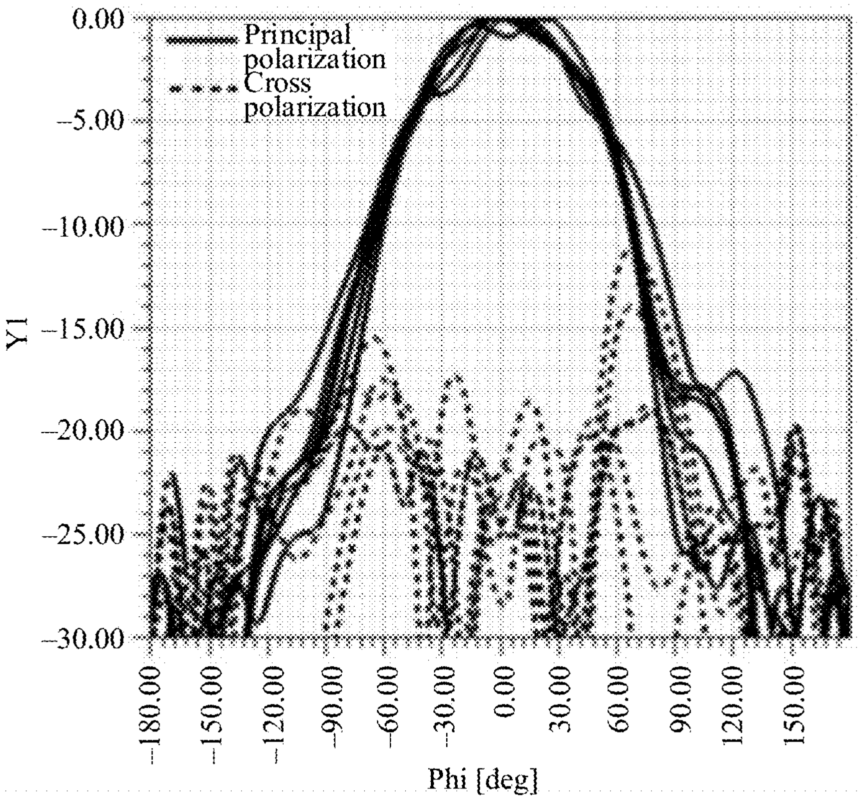
FIG. 2*b* is a −45° polarization pattern of a high-frequency antenna when a low-frequency antenna is not provided in the high-frequency antenna array in FIG. 1.
Figure 3A:
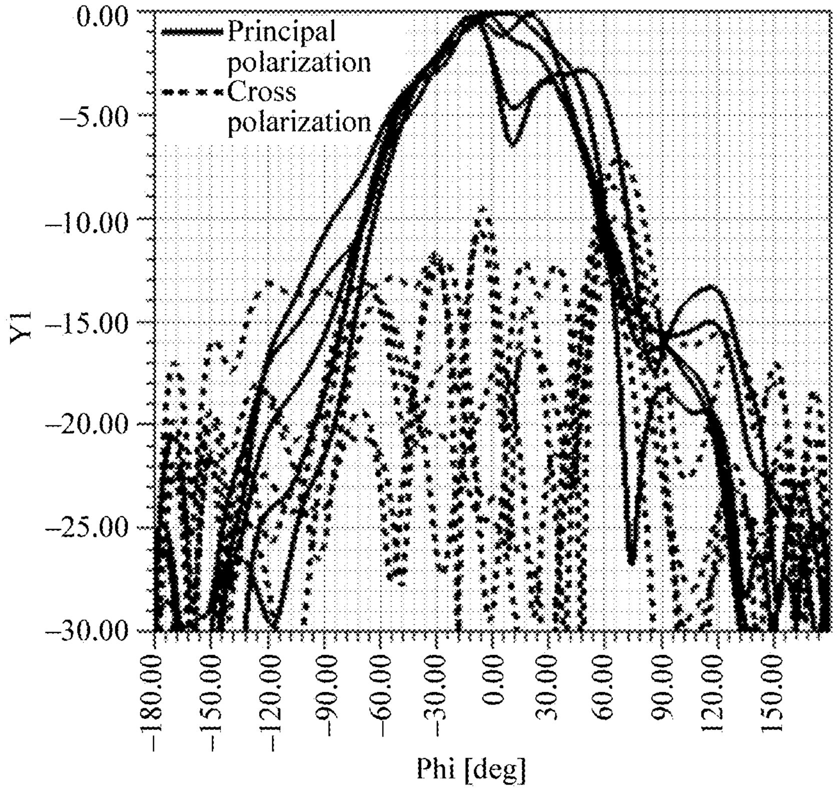
FIG. 3*a* is a +45° polarization pattern of a high-frequency antenna when a low-frequency antenna is provided in the high-frequency antenna array in FIG. 1.
Figure 3B:
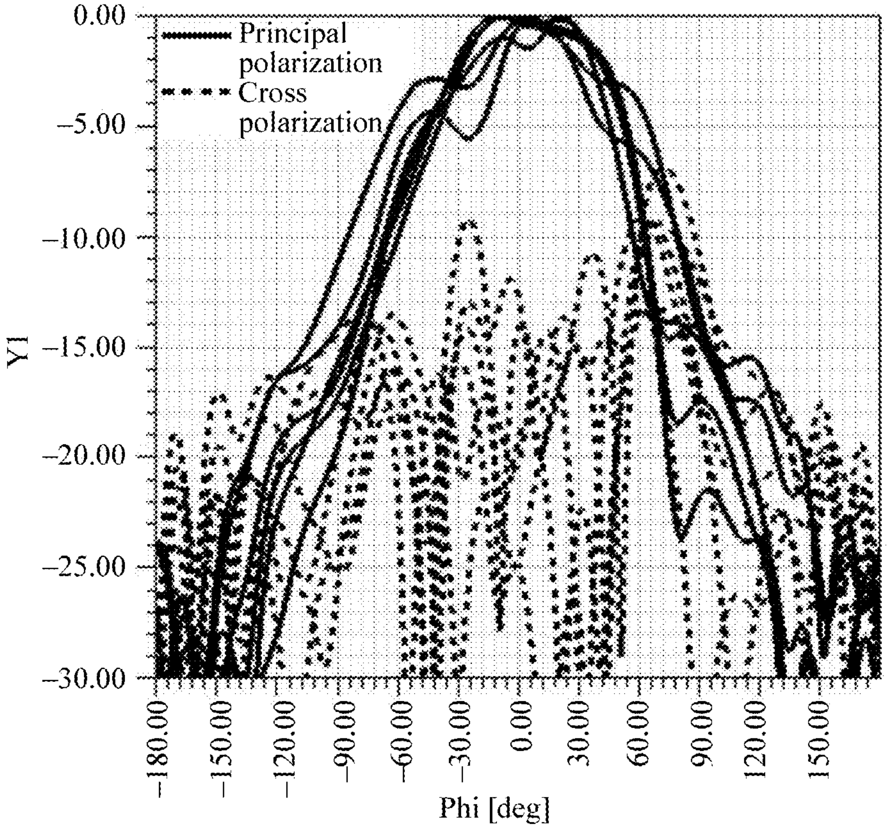
FIG. 3*b* is a −45° polarization pattern of a high-frequency antenna when a low-frequency antenna is provided in the high-frequency antenna array in FIG. 1.

FIG. 2*a* is a +45° polarization pattern of the high-frequency antenna 20 when the low-frequency antenna 30 is not provided in the array of the high-frequency antenna 20 in FIG. 1. FIG. 2*b* is a −45° polarization pattern of the high-frequency antenna 20 when the low-frequency antenna 30 is not provided in the array of the high-frequency antenna 20 in FIG. 1. FIG. 3*a* is a +45° polarization pattern of the high-frequency antenna 20 when the low-frequency antenna 30 is provided in the array of the high-frequency antenna 20 in FIG. 1. FIG. 3*b* is a −45° polarization pattern of the high-frequency antenna 20 when the low-frequency antenna 30 is provided in the array of the high-frequency antenna 20 in FIG. 1. In FIG. 2*a*, FIG. 2*b*, FIG. 3*a*, and FIG. 3*b*, all vertical coordinates represent normalized gain in unit of dB (decibel), all horizontal coordinates represent azimuth angles Phi in unit of “°” (that is, degree, degree), all solid lines represent principal polarization patterns, and all dotted lines represent cross polarization patterns. Referring to FIG. 2*a* and FIG. 3*a*, it can be learned that in the +45° polarization direction, a top of a main lobe of the solid line part in FIG. 3*a* has a downward depression relative to a top of a main lobe of the solid line part in FIG. 2*a*, which indicates that after the low-frequency antenna 30 is provided in the array of the high-frequency antenna 20 in FIG. 1, the gain stability of the high-frequency antenna 20 deteriorates; in addition, an average value of the dotted line part in FIG. 3*a* has a greater increase than an average value of the dotted line part in FIG. 2*a*, which indicates that after the low-frequency antenna 30 is provided in the array of the high-frequency antenna 20 in FIG. 1, the polarization suppression ratio of the high-frequency antenna 20 deteriorates. Referring to FIG. 2*b* and FIG. 3*b*, it can be learned that in a −45° polarization direction, a similar result can be obtained as in the +45° polarization direction.

To improve pattern parameters such as a polarization suppression ratio and gain stability of a high-frequency antenna in a common aperture antenna array, an antenna array is provided in the embodiments of this application.

Figure 4A:
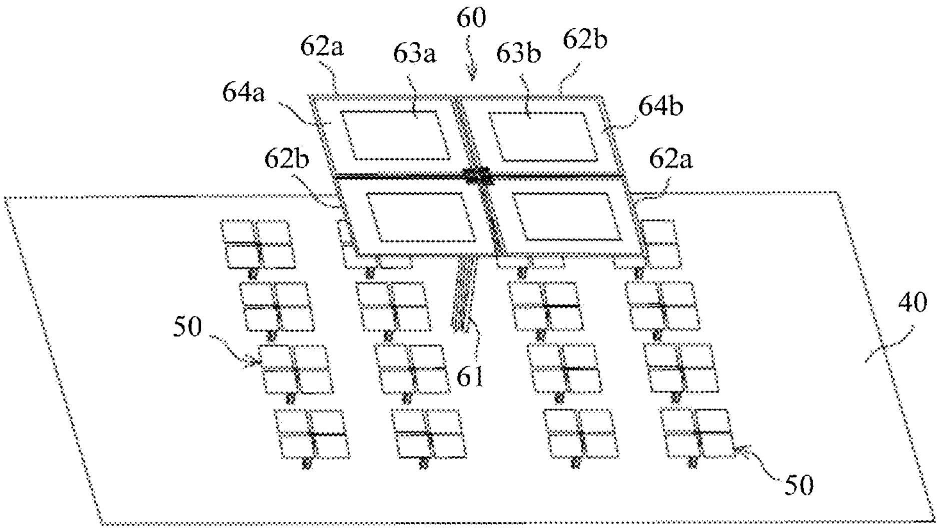
FIG. 4*a* is an example schematic diagram of an antenna array according to an embodiment of this application.
Figure 4B:
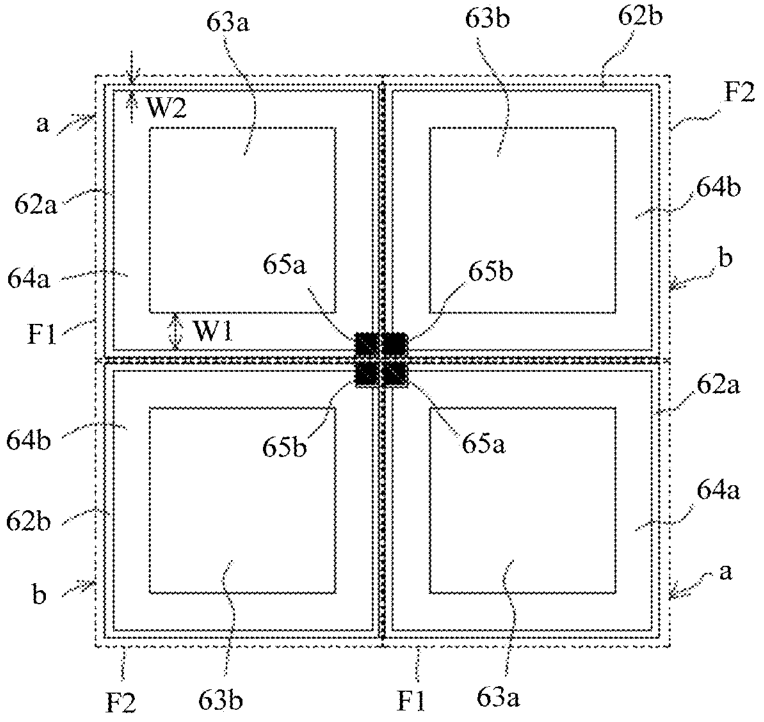
FIG. 4*b* is an enlarged view of a top view of a first antenna in FIG. 4*a;*

FIG. 4*a* is an example schematic diagram of an antenna array according to an embodiment of this application. FIG. 4*b* shows an enlarged view of a top view of a first antenna 60 in FIG. 4*a*. Referring to FIG. 4*a* and FIG. 4*b*, the antenna array includes a reflection panel 40 (a material of the reflection panel may be a metal material such as gold, silver, copper, iron, or aluminum, or an alloy material such as stainless steel, aluminum alloy, or nickel alloy), a first antenna 60 distributed on the reflection panel 40, and a plurality of second antennas 50 distributed (for example, distributed in array) on the reflection panel 40 and located around the first antenna 60. An operating frequency of the first antenna 60 is lower than an operating frequency of the second antenna 50. The second antenna 50 is, for example, a ±45° dual polarization dipole antenna, and the first antenna 60 is, for example, also a ±45° dual polarization dipole antenna. The first antenna 60 includes a +45° polarization antenna and a −45° polarization antenna, and both the +45° polarization antenna and the −45° polarization antenna are dipole antennas. The +45° polarization antenna includes two symmetrically arranged radiation parts a. Each radiation part a is used as a radiation part of a 45° polarization antenna, each radiation part a includes a frequency selection unit F1, and the frequency selection unit F1 includes, for example, a square dielectric substrate 64*a*. The dielectric substrate 64*a* may be made of bakelite plate, a glass fiber board, a plastic plate, or another material commonly used to make a PCB (printed circuit board, Printed Circuit Board) substrate. A square conductive grid 62*a* is provided on an edge of the dielectric substrate 64*a*, and a conductor 63*a* is provided in an area enclosed by the conductive grid 62*a*. The conductor 63*a* is, for example, a square conductive sheet structure attached to a surface of the dielectric substrate 64*a*. In addition, there is a gap between the conductor 63*a* and a frame of the corresponding conductive grid 62*a*, so that the conductor 63*a* and the frame of the corresponding conductive grid 62*a* are electrically coupled, and the frequency selection unit F1 has a good bandpass characteristic. Each side of the conductor 63*a* is, for example, parallel to a side of the conductive grid 62*a* that is opposite to the side of the conductor 63*a*. In some cases, there is a metal solder joint 65*a* for soldering a feeding part at a corner at which the conductive grids 62*a* of the two radiation parts a are close to each other, to facilitate soldering of the corresponding feeding part to the metal solder joint, so that the feeding part feeds power to the conductive grid 62*a*. The metal solder joint 65*a*, the conductive grid 62*a*, and the conductor 63*a* may be formed by depositing a copper foil (or another metal foil such as silver, aluminum, steel, or zinc) on the surface of dielectric substrate 64*a* and etching the copper foil. Alternatively, patterns of the conductive grid 62*a* and the conductor 63*a* may be printed directly on the surface of the dielectric substrate 64*a* to ensure dimensional accuracy and position accuracy of parts such as the metal solder joint 65*a*, the conductive grid 62*a*, and the conductor 63*a* in the conductive grid 62*a*.

Figure 4C:
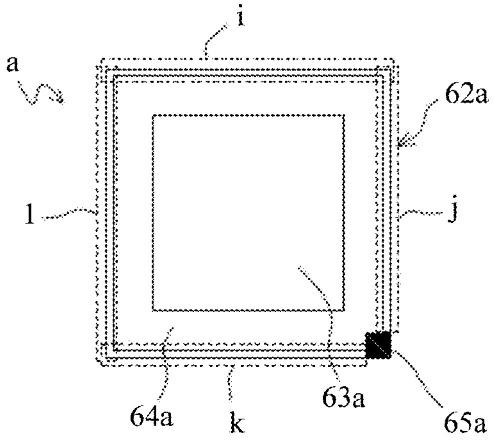
FIG. 4*c* is a schematic diagram of a radiation part a of the first antenna in FIG. 4*b;*

FIG. 4*c* is a schematic structural diagram of a radiation part a in FIG. 4*b*. To illustrate the specific meaning of the term "frame" in the "conductive grid frame" in this embodiment of this application, the radiation part a is used as an example. For details, refer to FIG. 4*c*. In FIG. 4*c*, a structure in each dashed frame (such as a dashed frame i, a dashed frame j, a dashed frame k, and a dashed frame 1) represents a "side frame" of a conductive grid 62*a*, and all "side frames" are called a "frame" of the conductive grid 62*a*.

Figure 4D:
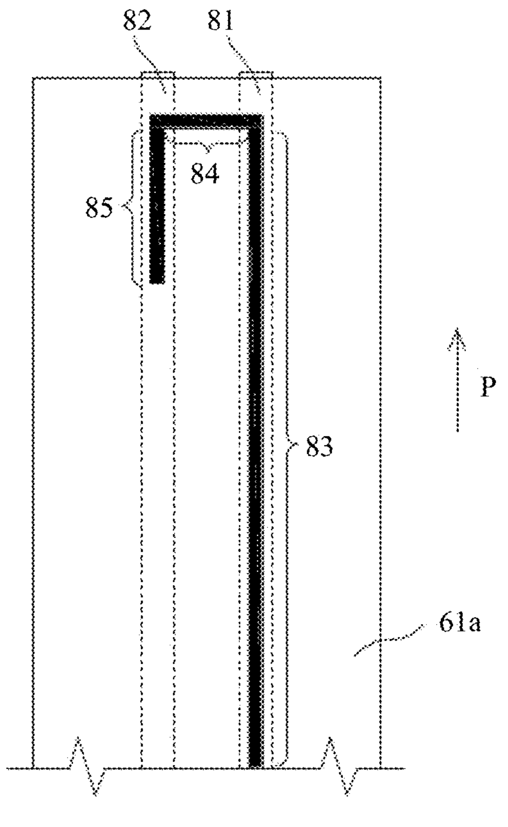
FIG. 4*d* is an example schematic diagram of a radiation part of the first antenna in FIG. 4*a;*

For example, FIG. 4*d* is an example schematic diagram of a feeding part used to feed power to the conductive grid 62*a*. The foregoing feeding part used to feed power to the conductive grid 62*a* uses, for example, a structure shown in FIG. 4*d*. In FIG. 4*d*, on two opposite side surfaces of an insulating support plate 61*a* (which may be used as a part of the support leg 61 to support two radiation parts a, and the insulating support plate 61*a* may be a bakelite plate, a glass fiber board, a plastic plate, or the like), a metal wire 81 and a metal wire 82 (for example, a copper wire or an aluminum wire) are arranged side by side on one side surface, and a bent signal wire is arranged on the other side surface. The signal wire includes three sections: a first section 83, a second section 84, and a third section 85. One end of the metal wire 81 in a P direction is soldered to the metal solder joint 65*a* in one radiation part a. One end of the metal wire 82 in the P direction is soldered to the metal solder joint 65*a* in the other radiation part a. An orthographic projection of the first segment 83 on a surface of the insulating support plate 61*a* and an orthographic projection of the metal wire 81 on the surface of the insulating support plate 61*a* overlap, and a length of the third segment 85 may be adjusted based on an operating frequency of the radiation part a. For example, a length of the first segment 83 is approximately 0.25 times a wavelength corresponding to the operating frequency of the radiation part a. An orthographic projection of the third segment 85 on the surface of the insulating support plate 61*a* and an orthographic projection of the metal wire 82 on the surface of the insulating support plate 61*a* overlap. An end of the first segment 83 in the P direction and an end of the third segment 85 in the P direction are connected through the second segment 84, and the end of the first segment 83 away from the second segment 84 is coupled to a signal source such as a radio frequency transceiver. When the signal source feeds power to the first segment 83, induced currents of the same magnitude are excited in the metal wire 81 and the metal wire 82, and the conductive grids 62*a* in the two radiation parts a then obtain feeding currents of the same magnitude, and a current balance between the conductive grids 62*a* in the two radiation parts a is further realized. The metal wire 81, the metal wire 82, and the signal wire (the first section 83, the second section 84, and the third section 85) form a feeder balun, implementing the balanced feeding to the two radiation parts a of the +45° polarized antenna. In addition, a coaxial cable may alternatively be used to feed power to the two radiation parts a of the +45° polarization antenna. The coaxial cable includes a metal conductive tube and a conductive core located on the metal conductive tube and arranged coaxially with the metal conductive tube. The conductive core is connected to and feeds power to the conductive grid 62*a* of one radiation part a, and the metal conductive tube is connected to and feeds power to the conductive grid 62*a* of the other radiation part a. In addition, the radiation parts are all directly electrically connected to and feed power to the conductive grid 62*a* through their own partial structures (for example, the metal wire 81 and the metal wire 82 of the feeder balun, or the metal conductive tube and the conductive core of the coaxial cable), or near-field coupling feeding with the conductive grid 62*a* may be used to feed power to the conductive grid 62*a*. In addition, the radiation part used to feed power to the radiation part a may also be in other forms, which are not described herein.

For example, a ratio of the operating frequency of the first antenna 60 to the operating frequency of the second antenna 50 in FIG. 4*a* is approximately 1:2, and a length of one side of the conductive grid 62*a* in the frequency selection unit F1 is slightly less than 0.25 times a vacuum wavelength corresponding to an operating band of the first antenna 60 (for example, a length of one side of the conductive grid 62*a* in the frequency selection unit F1 is 0.20 times, 0.22 times, 0.23 times, or 0.24 times a vacuum wavelength corresponding to an operating band of the first antenna 60), and approximately equal to 0.50 times a vacuum wavelength corresponding to an operating band of the second antenna 50 (for example, a length of one side of the conductive grid 62*a* in the frequency selection unit F1 is 0.4 times, 0.45 times, 0.50 times, 0.55 times, or 0.60 times a vacuum wavelength corresponding to an operating band of the second antenna 50).

In addition, the −45° polarization antenna includes two symmetrically arranged radiation parts b. Each radiation part b is a radiation part of the −45° polarization antenna. Each radiation part b includes a frequency selection unit F2. For structures (a conductive grid 62*b*, a conductor 63*b*, a metal solder joint 65*b*, a feeding part that feeds power to the conductive grid 62*b*, and the like) in the frequency unit F2, reference may be made to the corresponding structures (for example, the conductive grid 62*a*, the conductor 63*a*, the metal solder joint 65*a*, the feeding part that feeds power to the conductive grid 62*a*, and the like) in the frequency selection unit F1. When the radiation part b uses a feeder balun similar to that used by the radiation part a for feeding, there is another insulating support plate, corresponding to the insulating support plate 61*a*, for supporting the radiation part b. The insulating support plate used to support the radiation part b and the insulating support plate 61*a* may be arranged in a cross mode as the support leg 61 of the first antenna 60. In addition, two dielectric substrates 64*a* and two dielectric substrates 64*b* may be an integrated dielectric substrate structure, which is beneficial to improve structural stability of the first antenna 60 and helps to simplify a manufacturing process of the first antenna 60. To be specific, all metal components (the metal solder joint 65*a*, the conductive grid 62*a*, the conductor 63*a*, and the like) on the radiation part a and all metal components (the metal solder joint 65*b*, the conductive grid 62*b*, the conductor 63*b*, and the like) on the radiation part b may be formed at one time by etching a copper foil or printing a copper trace on the same dielectric substrate. This helps to ensure accuracy of a relative positional relationship between metal parts on different radiation parts (for example, two radiation parts a, two radiation parts b, or a radiation part a and a radiation part b).

Figure 5A:
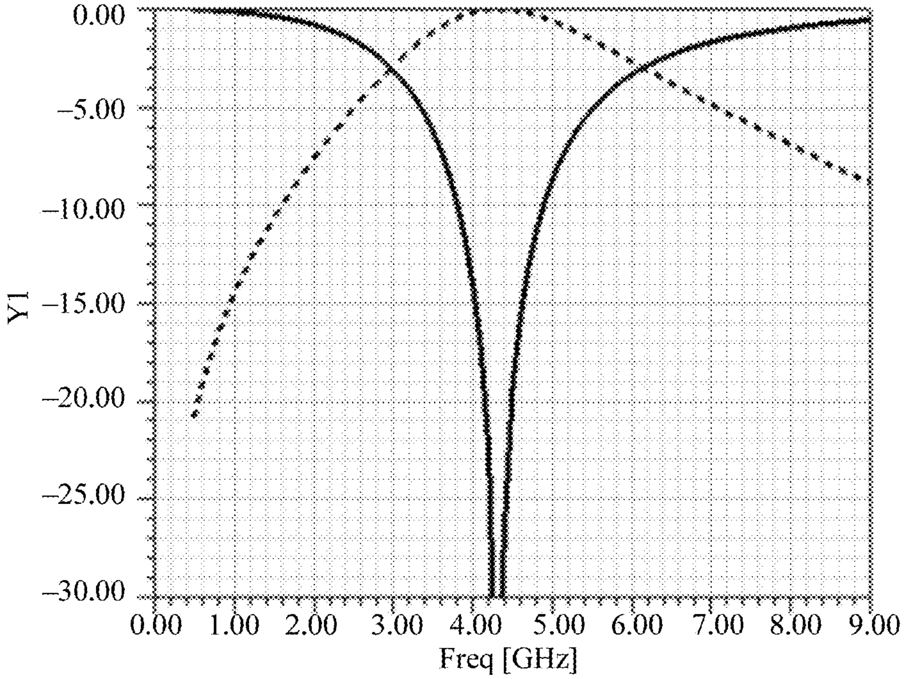
FIG. 5*a* is a frequency response characteristic diagram of a frequency selection unit F1 in FIG. 4*b;*

On the one hand, FIG. 5*a* is a frequency response characteristic diagram of the frequency selection unit F1 in FIG. 4*b*. Referring to FIG. 5*a*, a vertical axis of the frequency response characteristic diagram represents losses in unit of dB (that is, decibel), and a horizontal axis represents frequency in unit of GHz. A solid line part represents a reflectivity of electromagnetic waves at different frequencies at the frequency selection unit F1, and a dotted line part represents a transmittance of the electromagnetic waves at different frequencies at the frequency selection unit F1 in FIG. 4*b*. As shown in FIG. 5*a*, when a high-frequency signal at a frequency of 4.30 GHz (which is merely an example, and this value may be adjusted by adjusting dimensions and shapes of the conductive grid 62*a* and the conductor 63*b*, and a distance between the conductive grid 62*a* and the conductor 63*b*) reaches the radiation part a in FIG. 4*b*, the reflectance is smallest and the transmittance is largest. In FIG. 4*a*, the second antenna 50 radiates a higher frequency electromagnetic wave. When a high-frequency signal at a frequency of 4.30 GHz that is radiated from the second antenna 50 passes through the frequency selection unit F1, the high-frequency signal has an optimal transmittance at the frequency selection unit F1, or the frequency selection unit F1 has the optimal bandpass characteristic to the 4.30 GHz high-frequency signal. To be specific, the radiation part a of the first antenna 60 in FIG. 4*b* has the optimal bandpass characteristic to the operating frequency 4.30 GHz of the second antenna 50, that is, the operating frequency 4.30 GHz of the second antenna 50 is the optimal bandpass (also called a resonance frequency) for the frequency selection unit F1 in the radiation part a of the first antenna 60. In this case, more high-frequency signals radiated from the second antenna 50 can pass through the radiation part a, which can reduce a shielding effect of the radiation part a to the electromagnetic waves radiated from the second antenna 50.

Figure 5B:
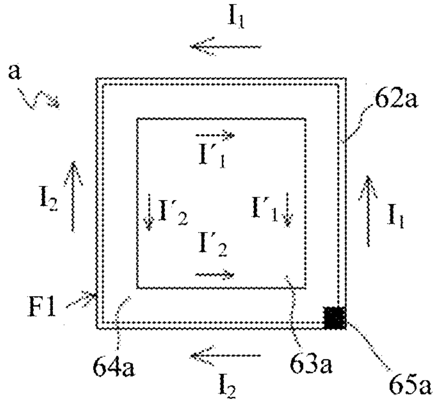
FIG. 5*b* is a schematic diagram of distribution of induced currents excited by a high-frequency signal radiated from a second antenna in FIG. 4*a* in a radiation part a of the first antenna in FIG. 4*b;*
Figure 5C:
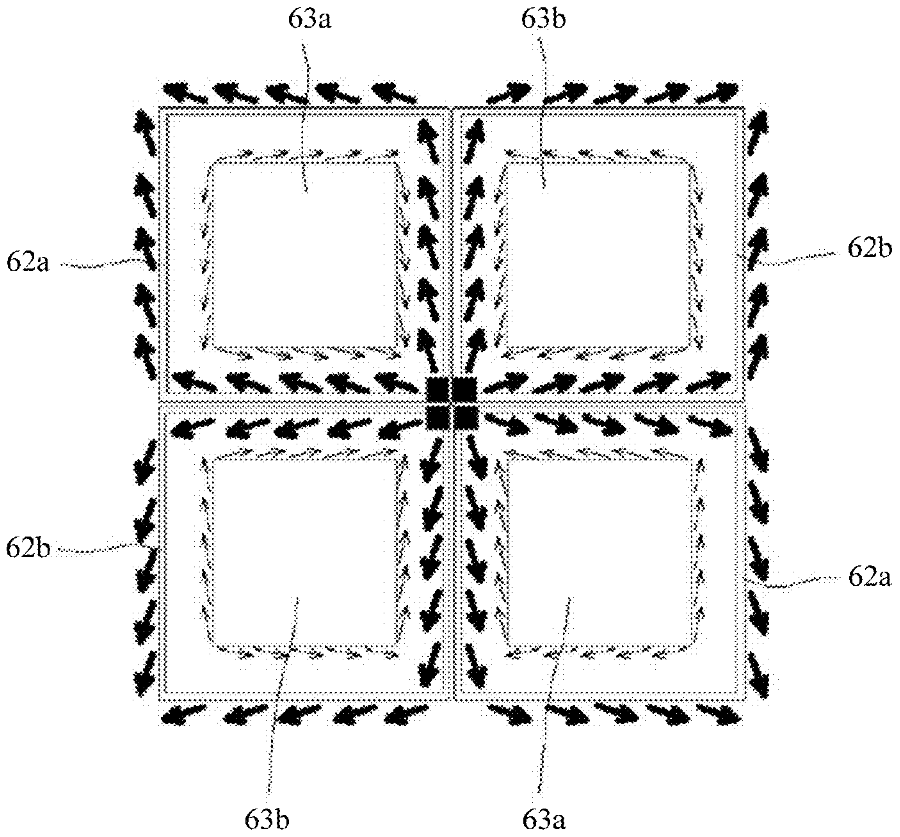
FIG. 5*c* is a schematic diagram of distribution of induced currents excited by a high-frequency signal radiated from a second antenna in FIG. 4*a* in each radiation part of the first antenna in FIG. 4*b;*
Figure 5D:
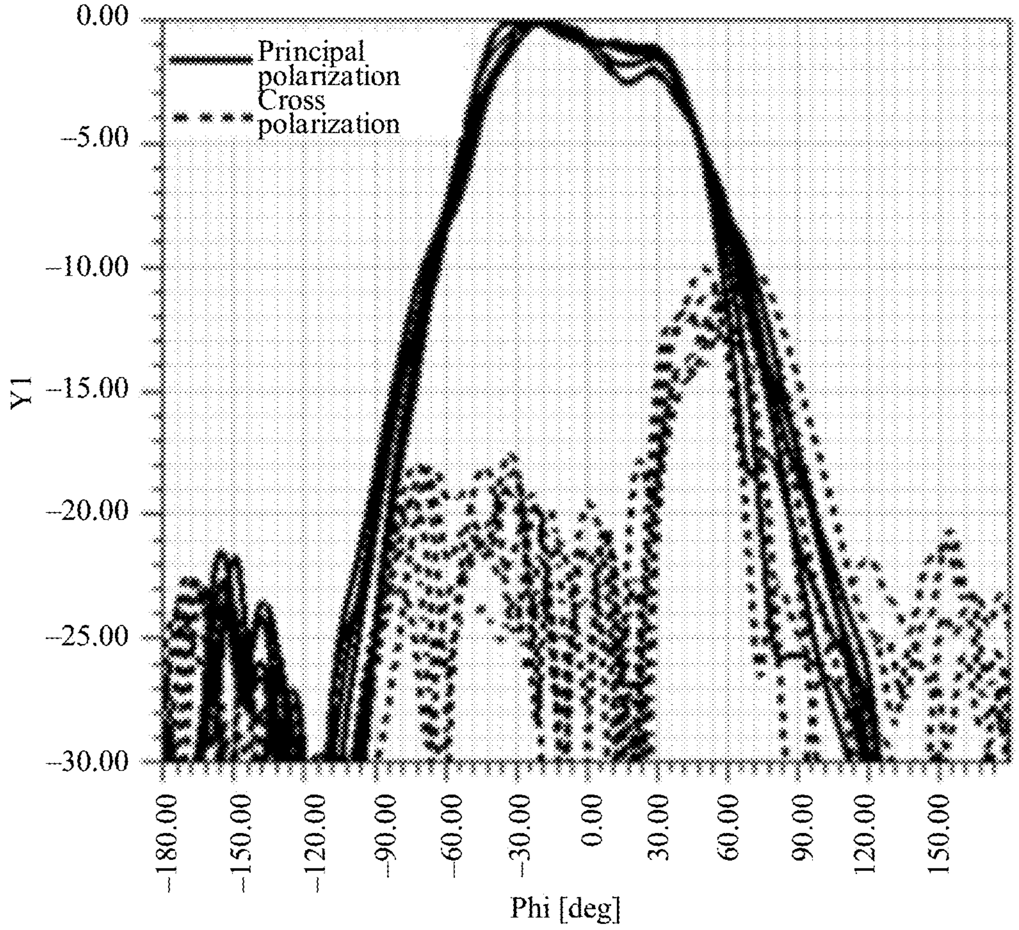
FIG. 5*d* is a +45° polarization pattern of a second antenna in FIG. 4*a;*
Figure 5E:
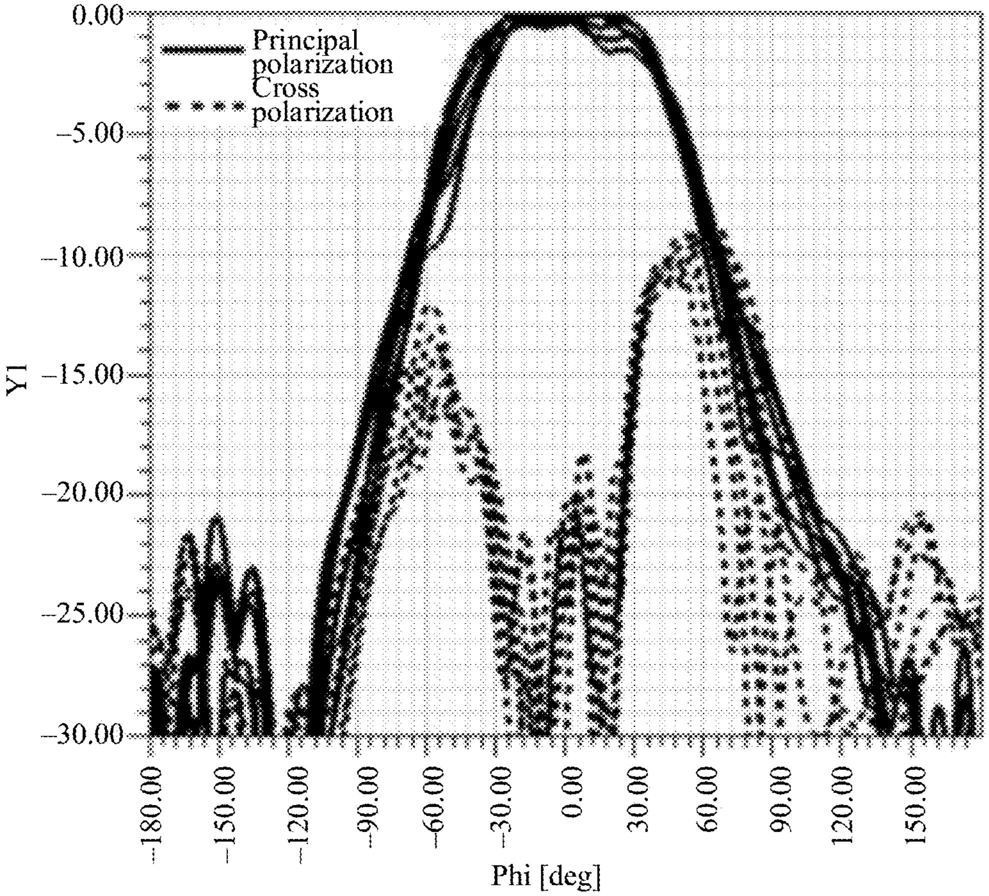
FIG. 5*e* is a −45° polarization pattern of a second antenna in FIG. 4*a;*

On the other hand, FIG. 5*b* shows distribution of induced currents excited by the high-frequency signal radiated from the second antenna 50 in FIG. 4*a* on parts of one radiation part a in FIG. 4*b*. It can be learned from FIG. 5*b* that the high-frequency signal radiated from the second antenna 50 excites an induced current I1 on two side frames of the conductive grid 62*a* and an induced current I2 on the other two side frames. In addition, the high-frequency signal radiated from the second antenna 50 also excites an induced current I'1 on two edges of the conductor 63*a* (opposite to positions of the two side frames at which the conductive grid 62*a* generates the induced current I1), and excites an induced current I'2 on the other two edges of the conductor 63*a* (opposite to positions of the two side frames at which the conductive grid 62*a* generates the induced current I2). The induced current I1 and the induced current I'1 are in opposite directions and can at least partially cancel each other (that is, the induced current I1 and the induced current I'1 may partially cancel each other, or may completely cancel each other). In this case, the induced current I1 and the induced current I'1 form a pair of coupling currents that cancel in pairs. Similar to the induced current I1 and the induced current I'1, the induced current I2 and the induced current I'2 form a pair of coupling currents that cancel in pairs. Finally, compared with the case in which the electromagnetic wave radiated from the high-frequency antenna 20 in the prior art shown in FIG. 1 excites a relatively large induced current on the frame of the ring-shaped low-frequency antenna 30, eventually resulting in deterioration of pattern indexes such as a polarization suppression ratio and gain stability of the high-frequency antenna 20, the induced currents (I1 and I2) on the radiation part a in FIG. 5*b* that are excited by the second antenna 50 are greatly reduced or even disappear completely. FIG. 5*c* shows distribution of induced currents excited, by the high-frequency signal radiated from the second antenna 50, on the two radiation parts a of the +45° polarization antenna and the two radiation parts b of the −45° polarization antenna in FIG. 4*b*. A thicker arrow represents distribution of the induced currents on the conductive grid (for example, the conductive grid 62*a* and the conductive grid 62*b*) that is excited by the high-frequency signal radiated from the second antenna 50, and a thinner arrow represents distribution of the induced currents on the conductor (the conductor 63*a* and the conductor 63*b*) that is excited by the high-frequency signal radiated from the second antenna 50. Based on the principle similar to that of the radiation part a in FIG. 5*b*, in FIG. 5*c*, the induced current excited on each conductive grid 62*a* is at least partially canceled by the induced current excited on the conductor 63*a* at the far field, and the induced current excited on each conductive grid 62*b* is at least partially canceled by the induced current excited on the conductor 63*b* at the far field. Therefore, the first antenna 60 reduces or even completely avoids radiating out electromagnetic waves with the same operating frequency as the second antenna 50. This helps to improve parameter performance such as the gain stability and the polarization suppression ratio in the pattern of the second antenna 50, and improve radiation performance of the second antenna 50. FIG. 5*d* shows the +45° polarization pattern of the second antenna 50 in FIG. 4*a*, and FIG. 5*e* shows the −45° polarization pattern of the second antenna 50 in FIG. 4*a*. In FIG. 5*d* and FIG. 5*e*, all vertical coordinates represent normalized gain in unit of dB (decibel), all horizontal coordinates represent azimuth angles Phi in unit of "°" degree, all solid lines represent principal polarization patterns, and all dotted lines represent cross polarization patterns. Compared with FIG. 3*a*, depression at the top of a main lobe of the solid line part in FIG. 5*d* becomes shallow or even disappears, indicating that compared with the high-frequency antenna 20 in FIG. 1, after the first antenna 60 in FIG. 4*a* uses the structure shown in FIG. 4*b*, the gain stability of the second antenna 50 is improved, and an average value of the dotted line part in FIG. 5*d* is greatly reduced, indicating that compared with the high-frequency antenna 20 in FIG. 1, after the first antenna 60 in FIG. 4*a* uses the structure shown in FIG. 4*b*, the polarization suppression ratio of the second antenna 50 is improved. In addition, compared with FIG. 3*b*, information similar to the figure can be obtained in FIG. 5*e*.

In addition, when the second antenna 50 radiates an electromagnetic wave of a frequency approximate to the optimal bandpass of the frequency selection unit F1 at 4.30 GHz, the frequency selection unit F1 also has a transmittance to the electromagnetic wave of this frequency. However, the transmittance is not as good as the transmittance of the frequency selection unit F1 to the high-frequency signal of the optimal bandpass 4.30 GHz. In this case, a pair of coupling currents (similar to the induced current I1 and the induced current I' 1) that cancel in pairs are also excited on the frame of the conductive grid 62*a* and the corresponding conductor 63*a*. In this embodiment of this application, when the high-frequency signal radiated from the second antenna 50 is mentioned, the term "high-frequency signal" refers to the electromagnetic wave of a frequency band that is radiated from the second antenna 50. Taking the radiation part a as an example, the electromagnetic wave on this frequency band can excite a pair of coupling currents that cancel in pairs on the frame of the conductive grid 62*a* and the corresponding conductor 63*a*.

The radiation part a is used as an example. A distance between an outer edge of the conductor 63*a* and an inner edge of the conductive grid 62*a* (refer to a width W1 in FIG. 4*b*) is greater than or equal to 0.001 times a vacuum wavelength corresponding to the operating band of the second antenna 50 (that is, the frequency band corresponding to the high-frequency signal radiated from the second antenna 50) and less than or equal to 0.1 times the vacuum wavelength corresponding to the operating band of the second antenna 50. For example, the width W1 is 0.001 times, 0.003 times, 0.005 times, 0.01 times, 0.02 times, 0.03 times, 0.04 times, 0.05 times, 0.08 times, or 0.1 times the vacuum wavelength corresponding to the operating band of the second antenna 50, to ensure that the distance between the conductor 63*a* and the frame of the corresponding conductive grid 62*a* is not too large and that the induced current on the conductor 63*a* and the induced current on the corresponding conductive grid 62*a* can be coupled in pairs and cancel each other.

The radiation part a is still used as an example. When the conductive grid 62*a* of the frequency selection unit F1 is arranged, a width of the frame of the conductive grid 62*a* (the width of the conductive grid 62*a* refers to a distance from an outer edge to an inner edge of the orthographic projection of the frame of the conductive grid 62*a* on a top surface of the dielectric substrate 64*a*; refer to the width W2 in FIG. 4*b*) should not be too large. If a value of the width W2 is too large, the induced current is also excited by the electromagnetic wave radiated from second antenna 50 on an edge of the frame of the conductive grid 62*a* that is far from the conductor 63*a*, and the induced current is not easy or even unable to be canceled by the induced current on the conductor 63*a* at the far field. Moreover, the value of width W2 should not be too small; otherwise, the frame of conductive grid 62*a* can only withstand a relatively small current (in other words, the feeding part of the first antenna 60 cannot feed a relatively large current to the radiation part a) and a relatively low power, resulting in a relatively low bandwidth, limited capacity, and a poor radiation capability of the radiation part a, as well as a poor strength of the conductive grid 62*a* that shortens a lifespan. To avoid the foregoing problems, for example, the width W2 is greater than or equal to 0.001 times a vacuum wavelength corresponding to the operating band of the second antenna 50 (that is, the frequency band corresponding to the high-frequency signal radiated from the second antenna 50) and less than or equal to 0.1 times the vacuum wavelength corresponding to the operating band of the second antenna 50. For example, the width W2 is 0.001 times, 0.003 times, 0.005 times, 0.01 times, 0.02 times, 0.03 times, 0.04 times, 0.05 times, 0.07 times, 0.09 times, or 0.1 times the vacuum wavelength corresponding to the operating band of the second antenna 50. In addition, it can be learned in FIG. 4*b* that, an entire radiation surface of the radiation part a is covered by the frequency selection unit F1, and no other conductive structure is provided around the conductive grid 62*a* of the frequency selection unit F1 (for example, an insulating structure or nothing can be arranged around the frequency selection unit F1). If a conductive structure is arranged around the conductive grid 62*a* (no matter whether the conductive structure is electrically connected to the conductive grid 62*a*), the high-frequency signal radiated from the second antenna 50 excites an induced current on the conductive structure (for example, on an edge of the conductive structure away from the conductive grid 62*a*), and the induced current excited on the conductive structure is not easy or even unable to be canceled by of the induced current of the conductor 63*a* at the far field. The induced current excited in the conductive structure by the high-frequency signal radiated from the second antenna 50 still radiates an electromagnetic wave of the same frequency as the second antenna 50 into the air, resulting in deterioration of the pattern parameters such as the gain stability and the polarization suppression ratio of the second antenna 50.

Figure 6A:
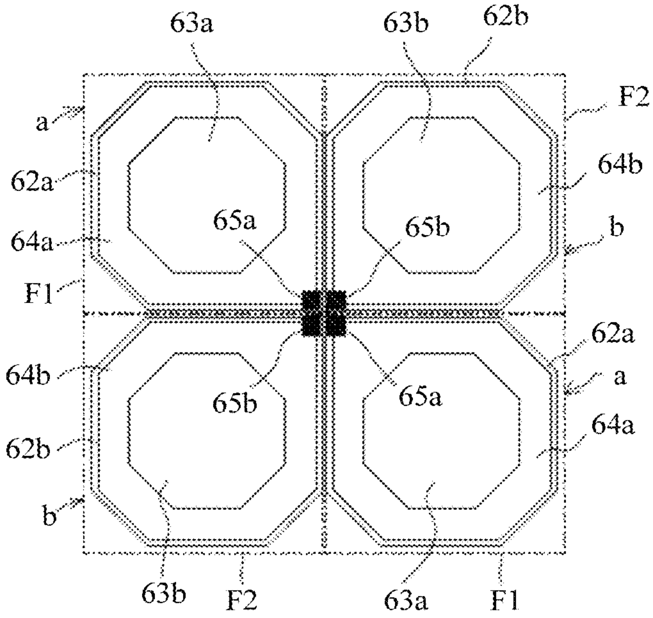
FIG. 6*a* is another example schematic diagram of a first antenna in an antenna array according to an embodiment of this application.

In FIG. 4*b*, both the conductive grid 62*a* in the radiation part a and the conductive grid 62*b* in the radiation part b are of a square shape. FIG. 6*a* shows a variation of the first antenna 60 shown in FIG. 4*b*. As shown in FIG. 6*a*, in some cases, a chamfered structure may be provided at the other three corners of the conductive grid 62*a* other than the corner at which the metal solder joint 65*a* is provided (or a chamfered structure is provided only at corners of the conductive grid 62*a* that are on the same diagonal as the corners at which the metal solder joint 65*a* is provided, or a chamfered structure is provided only at two corners of the conductive grid 62*a* that are on different diagonals from the corners at which the metal solder joint 65*a* is provided, provided that the radiation part a is symmetric with respect to a +45° axis and a −45° axis), to optimize the pattern indicators of the first antenna 60 in some cases, so that the first antenna 60 has better radiation performance. In addition, a chamfered structure is arranged at each of the four corners of the conductor 63*a*. Arranging a chamfer at the corner of the conductor 63*a* close to the metal solder joint 65*a* is to keep the edge of the conductor 63*a* and the metal solder joint 65*a* at a specific distance, and arranging chamfered structures at the other three corners of the conductor 63*a* is to prevent a right-angle structure of the conductor 63*a* from being too close to the chamfered structure of the conductive grid 62*a*. The foregoing arrangement makes the inner edge of the conductive grid 62*a* and the outer edge of the conductor 63*a* have an even gap width, and avoids that when the width of the gap between the inner edge of the conductive grid 62*a* and the outer edge of the conductor 63*a* is uneven, the induced current on the conductive grid 62*a* corresponding to a narrow gap is relatively strong and losses are relatively high.

Figure 6B:
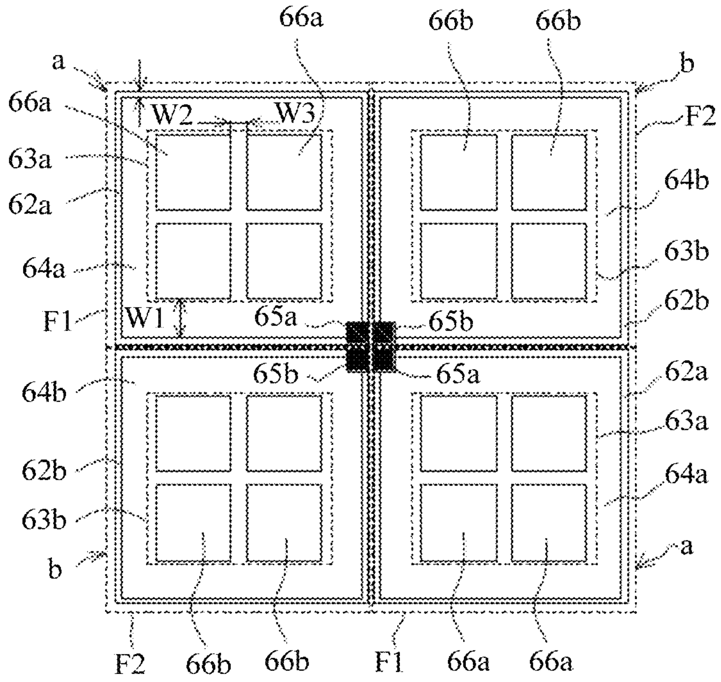
FIG. 6*b* is another example schematic diagram of a first antenna in an antenna array according to an embodiment of this application.

FIG. 6*b* shows a variation of the first antenna 60 shown in FIG. 4*b*. A difference between FIG. 6*b* and FIG. 4*b* lies in that each conductor 63*a* is divided into four sub-conductors 66*a* distributed in an array, and every two adjacent sub-conductors 66*a* are separated from each other (may be coupled to each other in some cases), and each conductor 63*b* may have the same arrangement as the conductor 63*a*. The radiation part a is used as an example. In some cases, to make the radiation part a radiate an electromagnetic wave of a required frequency, a total length of the frame of the conductive grid 62*a* is fixed and cannot be changed. When the operating frequency of the second antenna 50 is relatively high, the second antenna 50 cannot match the radiation part a well. In other words, the conductive grid 62*a* is rather large, and the frequency selection unit F1 can only have a good transmittance to an electromagnetic wave of a relatively low frequency, but does not have a good transmittance to an electromagnetic wave that is radiated from the second antenna 50 and that has a relatively high frequency. In addition, the induced current on the conductive grid 62*a* cannot be canceled appropriately, and the polarization suppression ratio and the gain stability of the second antenna 50 are still poor. If the dimension of the conductor 63*a* (for example, a side length) is reduced to make the frequency selection unit F1 well adapted to the second antenna 50, the width W1 of the gap between the frame of the conductive grid 62*a* and the edge of the corresponding conductor 63*a* is too large, and a good electrical coupling cannot be achieved between the conductor 63*a* and the conductive grid 62*a*. By dividing each conductor 63*a* into a plurality of sub-conductors 66*a*, in a condition that the width W1 of the gap between the conductive grid 62*a* and the sub-conductor 66*a* is not too large, the frequency selection unit F1 can have a good transmittance to the high-frequency signal radiated from the second antenna 50, and an induced current on an edge of each sub-conductor 66*a* and the induced current on the conductive grid 62*a* cancel each other, ensuring that the pattern parameters such as the polarization suppression ratio and gain stability of the second antenna 50 are improved.

It should be noted that in FIG. 6*b*, the conductor 63*a* is divided into four square sub-conductors 66*a* distributed in an array, but actually, the conductor 63 may be divided into a plurality of (for example, 2, 3, or more than 5) sub-conductors 66*a*. Moreover, the plurality of sub-conductors 66*a* may be arranged arbitrarily, and a shape of the sub-conductor 66*a* is not limited to a square, and may alternatively be a rectangle, a circle, a triangle, or another shape. To enable electrical coupling between adjacent sub-conductors 66*a*, a width (refer to the width W3 in FIG. 6*b*) of a gap between every two adjacent sub-conductors 66*a* is greater than or equal to 0.001 times a vacuum wavelength corresponding to the operating band of the second antenna 50 (the frequency band corresponding to the high-frequency signal radiated from the second antenna 50) and less than or equal to 0.1 times the vacuum wavelength corresponding to the operating band of the second antenna 50. For example, the width W3 is 0.001 times, 0.0025 times, 0.003 times, 0.005 times, 0.01 times, 0.02 times, 0.03 times, 0.04 times, 0.05 times, 0.08 times, or 0.1 times the vacuum wavelength corresponding to the operating band of the second antenna 50. More specifically, when the width (refer to the width W3 in FIG. 6*b*) of the gap between every two adjacent sub-conductor 66*a* is greater than or equal to 0.0025 times the vacuum wavelength corresponding to the operating band of the second antenna 50 (the frequency band corresponding to the high-frequency signal radiated from the second antenna 50) and less than or equal to 0.05 times the vacuum wavelength corresponding to the operating band of the second antenna 50, a resonant frequency of the frequency selection unit F1 is significantly increased.

Figure 6C:
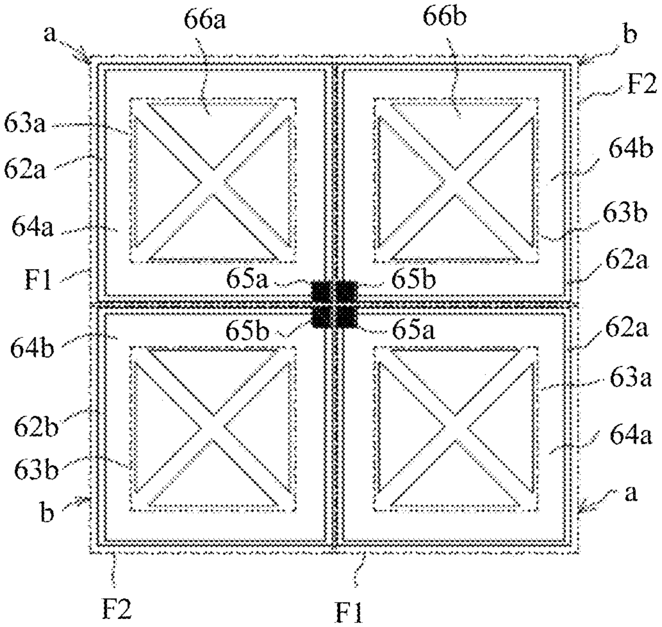
FIG. 6*c* is another example schematic diagram of a first antenna in an antenna array according to an embodiment of this application.
Figure 6D:
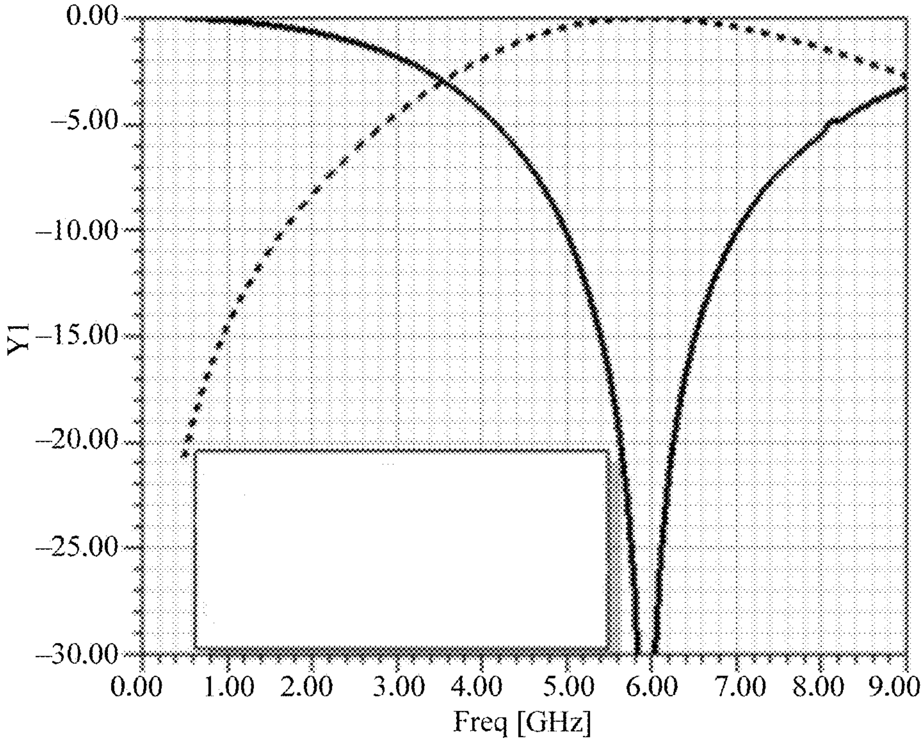
FIG. 6*d* is a frequency response characteristic diagram of a frequency selection unit F1 of the first antenna in FIG. 6*c;*

For example, FIG. 6*c* shows another example variation of the first antenna 60 shown in FIG. 4*b*. In FIG. 6*c*, four isosceles right-angled triangle sub-conductors 66*a* (merely an example) are obtained by cutting the conductors 63*a* along two diagonals of the entire square conductor 63*a* in FIG. 4*b*. A gap between every two adjacent sub-conductors 66*a* meets a requirement of the foregoing width W3 (to be specific, greater than or equal to 0.001 times the vacuum wavelength corresponding to the operating band of the second antenna 50 and less than or equal to 0.1 times the vacuum wavelength corresponding to the operating band of the second antenna 50). FIG. 6*d* shows a frequency response characteristic diagram of the frequency selection unit F1 in the radiation part a of the first antenna 60 when the first antenna 60 shown in FIG. 6*c* is used. A vertical axis of the frequency response characteristic diagram represents losses in unit of dB (that is, decibel), and a horizontal axis represents frequency in unit of GHz. It can be learned from FIG. 6*d* that, compared with to FIG. 5*a*, the resonant frequency of the frequency selection unit F1 raises to approximately 5.90 GHz. In other words, after the square conductor 63*a* in FIG. 4*b* is transformed into the form of the conductor 63*a* in FIG. 6*c*, the resonant frequency of the frequency selection unit F1 in the first antenna 60 raises.

Figure 6E:
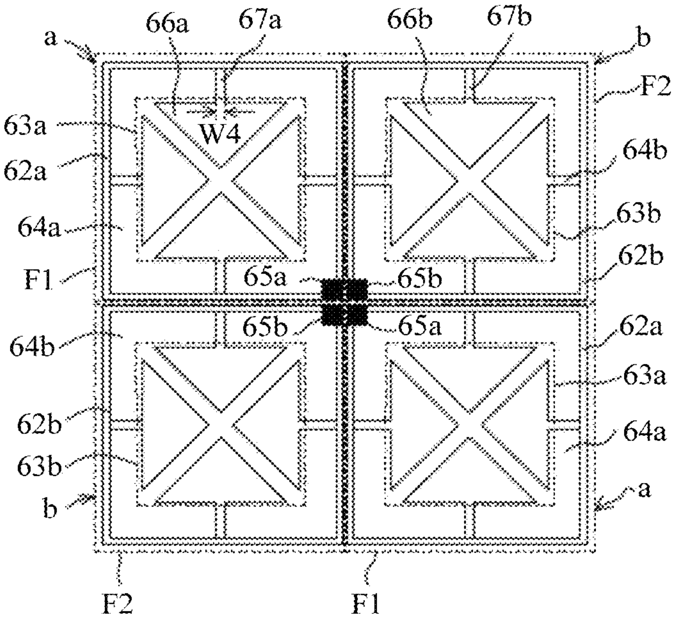
FIG. 6*e* is another example schematic diagram of a first antenna in an antenna array according to an embodiment of this application.
Figure 6F:
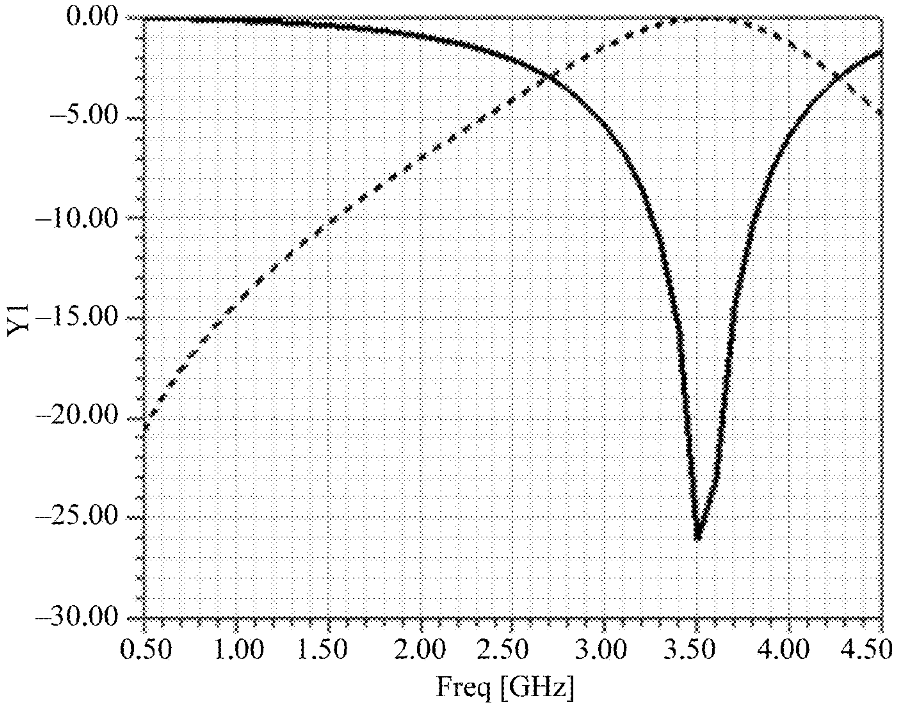
FIG. 6*f* is a frequency response characteristic diagram of a frequency selection unit F1 of the first antenna in FIG. 6*e;*

For another example, FIG. 6*e* shows an example variation of the first antenna 60 shown in FIG. 6*c*. In FIG. 6*e*, a hypotenuse of each isosceles right-angled triangle sub-conductor 66*a* is electrically connected to a corresponding side frame in the frame of the conductive grid 62*a* through a band-shaped (merely an example) conductor connecting part 67*a* (whose material may be the same as that of the sub-conductor 66*a* and which is formed at one time when the copper foil is patterned), and a width (for example, the width W4 in FIG. 6*e*) of a part connecting a side of the sub-conductor 66*a* and the conductor connecting part 67*a* is, for example, greater than or equal to 0.001 times the vacuum wavelength corresponding to the operating band of the second antenna 50 (that is, the frequency band corresponding to the high-frequency signal radiated from the second antenna 50) and less than or equal to 0.1 times the vacuum wavelength corresponding to the operating band of the second antenna 50. For example, the width W4 is 0.001 times, 0.003 times, 0.005 times, 0.01 times, 0.02 times, 0.03 times, 0.04 times, 0.05 times, 0.08 times, or 0.1 times the vacuum wavelength corresponding to the operating band of the second antenna 50. FIG. 6*f* shows a frequency response characteristic diagram of the frequency selection unit F1 in the radiation part a of the first antenna 60 when the first antenna 60 shown in FIG. 6*e* is used. A vertical axis of the frequency response characteristic diagram represents losses in unit of dB (that is, decibel), and a horizontal axis represents frequency in unit of GHz. As shown in FIG. 6*f*, after a conductor connecting part 67*a* is added based on FIG. 6*c*, the resonant frequency of the frequency selection unit F1 is reduced to 3.50 GHz, indicating that the frequency selection unit F1 still has a bandpass characteristic, and the resonant frequency of the frequency selection unit F1 in FIG. 6*e* is lower than that of the frequency selection unit F1 in FIG. 6*c*. Similarly, the radiation part b may have a form similar to the radiation part a (as shown in FIG. 6*e*, a sub-conductor 66*b* has the same structure as the sub-conductor 66*a*, and a conductor connecting part 67*b* has the same structure as the conductor connecting part 67*a*).

It can be learned from the foregoing analysis that the entire conductor 63*a* may be divided into the plurality of sub-conductors 66*a* in FIG. 6*c* to increase the resonant frequency of the frequency selection unit F1, and each sub-conductor 66*a* may be electrically connected to the frame of the conductive grid 62*a* to lower the resonance frequency of the frequency selection unit F1. According to the foregoing method, frequencies of both the first antenna 60 and the second antenna 50 can be retained without changing the dimension of the conductive grid 62*a*, in other words, a frequency ratio of the two can be ensured.

In addition, in addition to the solid structure shown in FIG. 4*b*, the conductor 63*a* may alternatively be drilled inside the conductor 63*a*. If the conductor 63*a* is in a circular ring shape, a ring width of the circular ring-shaped conductor 63*a* should not be less than 0.25 times an outer contour diameter. If the conductor 63*a* is in a square ring shape (a ring structure with a square outer contour), a ring width should not be less than 0.25 times a side length of the outer contour to ensure that the frequency selection characteristic of the frequency selection unit F1 is basically unchanged.

In FIG. 4*a* and FIG. 4*b*, each radiation part a of the first antenna 60 includes only one frequency selection unit F1. When a difference between the operating frequency of the first antenna 60 and the operating frequency of the second antenna 50 is large, each radiation part a including only one frequency selection unit F1 cannot meet frequency ratio requirements of the first antenna 60 and the second antenna 50. To meet the different frequency ratio requirements of the first antenna 60 and the second antenna 50, each radiation part a may include a plurality of frequency selection units F1.

In an embodiment, a minimum distance between the radiation part of the first antenna 60 and at least part of the radiation part of the second antenna 50 is less than or equal to 0.5 times (for example, 0.05 times, 0.1 times, 0.2 times, 0.3 times, 0.4 times, or 0.5 times) of the vacuum wavelength corresponding to the operating band of the first antenna 60, so that the antenna array has better compactness. In this way, when the first antenna 60 and second antenna 50 in the foregoing embodiment form the antenna array, parameters such as the polarization suppression ratio and gain stability of the second antenna 50 are not prone to be deteriorated while ensuring the antenna array to be more compact.

Figure 7A:
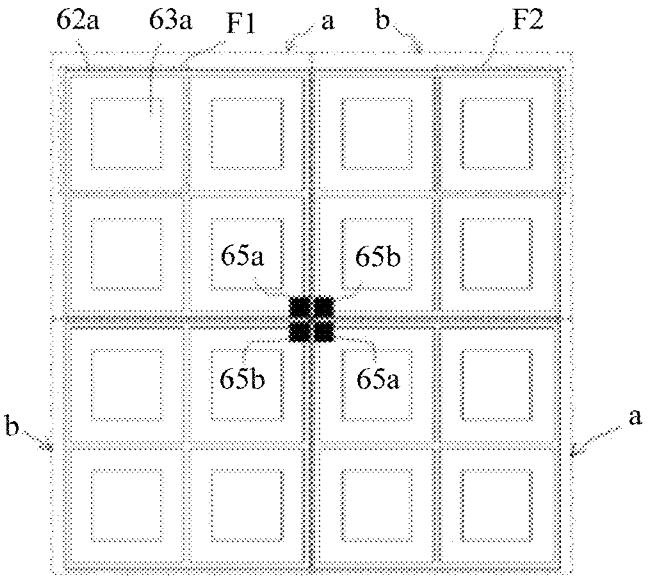
FIG. 7*a* is another example schematic diagram of a first antenna in an antenna array according to an embodiment of this application.
Figure 7B:
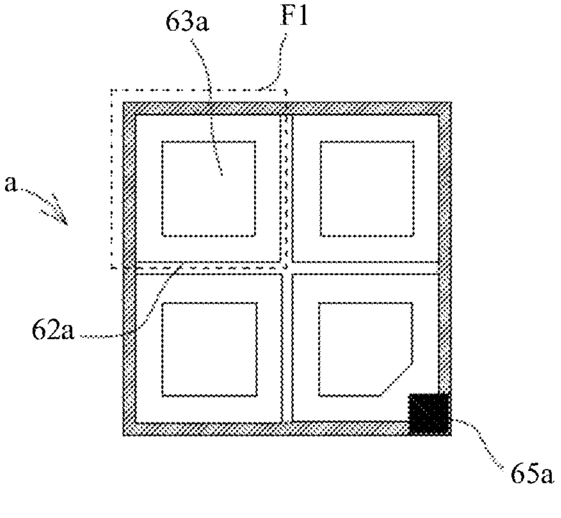
FIG. 7*b* is an enlarged view of a radiation part a of the first antenna in FIG. 7*b;*
Figure 7C:
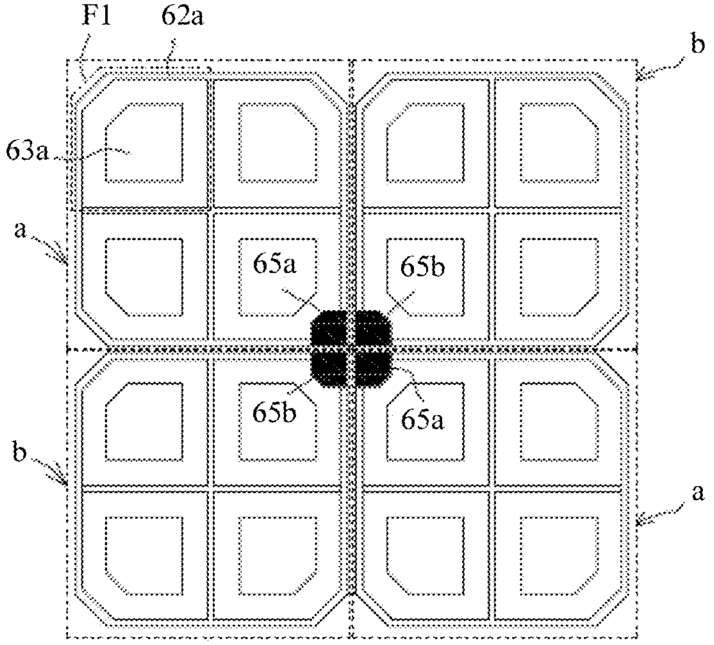
FIG. 7*c* is another example schematic diagram of a first antenna in an antenna array according to an embodiment of this application.

FIG. 7*a* is an example schematic diagram in which each radiation part in the first antenna 60 includes four frequency selection units. As shown in FIG. 7*a*, each radiation part a includes four frequency selection units F1 (in FIG. 7*a*, only one frequency selection unit F1 in the radiation part a is marked for example. It should be understood that the other three structures in the same radiation part a that are similar to the marked frequency selection unit F1 are actually frequency selection units F1), and the four frequency selection units F1 are arranged in an 2×2 array. Similar to that in FIG. 4*b*, each frequency selection unit F1 includes a square conductive grid 62*a*, each conductive grid 62*a* has a square conductor 63*a* electrically coupled to the conductive grid 62*a*, every two adjacent conductive grids 62*a* in the radiation part a are electrically connected to form a grid structure, and a feeding part (for example, a feeder balun) is electrically connected to the metal solder joint 65*a*, to feed power to a conductive grid 62*a* at a corner of the radiation part a to use an outer frame of the grid structure formed by the conductive grid 62*a* (the radiation part a in FIG. 7*a* is used as an example; referring to FIG. 7*b*, a diagonally shaded part in FIG. 7*b* is the "outer frame" of the grid structure; the "outer frame" is formed by a "frame" of each conductive grid 62*a* that is exposed to the outside and not covered by other conductive grids 62*a*, and therefore the "outer frame" is also referred to as "outer sides of the conductive grids 62*a* in the plurality of frequency selection units F1") as at least a part of the radiation part of the first antenna 60. The conductor 63*a* in the frequency selection unit F1 near the metal solder joint 65*a* has a chamfered structure to bypass the metal solder joint 65*a*. For parameters of each frequency selection unit F1 in FIG. 7*a*, refer to the corresponding parameter requirements of the frequency selection unit F1 in FIG. 4*b*. It should be noted that in the ±45° dual polarization dipole antenna, the feeding part feeds power to the outer frame of the grid structure formed by the conductive grid 62*a*, instead of feeding power to a shared side frame of two adjacent conductive grids 62*a*, which is conducive to concentrating feeding points of each radiation part a and radiation part b into a small range. For details, refer to the arrangement of the metal solder joint 65*a* and the metal solder joint 65*b* in FIG. 7*a*. This facilitates centralized arrangement of feeding parts such as the feeder baluns. In addition, the first antenna 60 can have a better polarization suppression ratio. It can be learned from FIG. 7*a* that, compared with FIG. 4*b*, in the radiation part a, the dimension (for example, a side length) of the radiation part of the first antenna 60 is significantly larger than the dimension (for example, a side length) of the frequency selection unit F1. In this case, a ratio of the operating frequency of the first antenna 60 to the operating frequency of the second antenna 50 is approximately 1:4. A length of one side frame of the conductive grid 62*a* in each frequency selection unit F1 is approximately 0.125 times (for example, 0.115 times, 0.120 times, 0.125 times, or 0.130 times) of a vacuum wavelength corresponding to the operating band of the first antenna 60, and is approximately 0.5 times a vacuum wavelength corresponding to the operating band of the second antenna 50 (that is, the frequency band corresponding to the high-frequency signal radiated from the second antenna 50) (for example, a length of one side of the conductive grid 62*a* in the frequency selection unit F1 is 0.4 times, 0.45 times, 0.50 times, 0.55 times, or 0.60 times the vacuum wavelength corresponding to the operating band of the second antenna 50). When the first antenna 60 shown in FIG. 7*a* is used as the first antenna 60 in FIG. 4*a*, the pattern parameters such as the gain stability and polarization suppression ratio of the second antenna 50 can also be greatly improved. In addition, FIG. 7*b* shows a variation of the first antenna 60 shown in FIG. 7*a*. Compared with FIG. 7*a*, in FIG. 7*c*, in one radiation part a, the three conductive grids 62*a* among the four conductive grids 62*a*, except for that the one close to the metal solder joint 65*a*, each has a chamfered structure (or a chamfered structure is only arranged on the conductive grid 62*a* that is located on the same diagonal line as the conductive grid provided with the metal solder joint 65*a* on the grid structure, or a chamfered structure is arranged only on a conductive grid 62*a* that is located in the grid structure on a diagonal different from that on which the conductive grid 62*a* provided with the metal solder joint 65*a* is located, and these chamfered structures are all located at the corners of the entire grid structure, provided that the radiation part a is still symmetrical with respect to the +45° polarization axis after the chamfered structures are arranged), so that the first antenna 60 has better pattern indicators in some cases and the radiation performance of the first antenna 60 is improved. Accordingly, each of the conductors 63*a* in the three conductive grids 62*a* has a chamfered structure, and the chamfered structure of the conductor 63*a* and the chamfered structure of the conductive grid 62*a* are arranged correspondingly, to ensure that a width of a gap between the conductive grid 62*a* and the corresponding conductor 63*a* is even. In addition, similar to each frequency selection unit F1 in FIG. 6*b*, in each radiation unit a in FIG. 7*a*, the conductor 63*a* included in each frequency selection unit F1 may include a plurality of sub-conductors arranged at an interval. For details, refer to the arrangement of the frequency selection unit F1 in FIG. 6*b*. Alternatively, at least some of the sub-conductors may be electrically connected to the frame of the conductive grid 62*a*. For details, refer to the arrangement of the frequency selection unit F1 in FIG. 6*e*. However, to ensure that the second antenna 50 has a good polarization suppression ratio, each radiation part a and each radiation part b need to be completely symmetric with respect to the +45° axis, the −45° axis, the horizontal axis, and the vertical axis.

Figure 8:
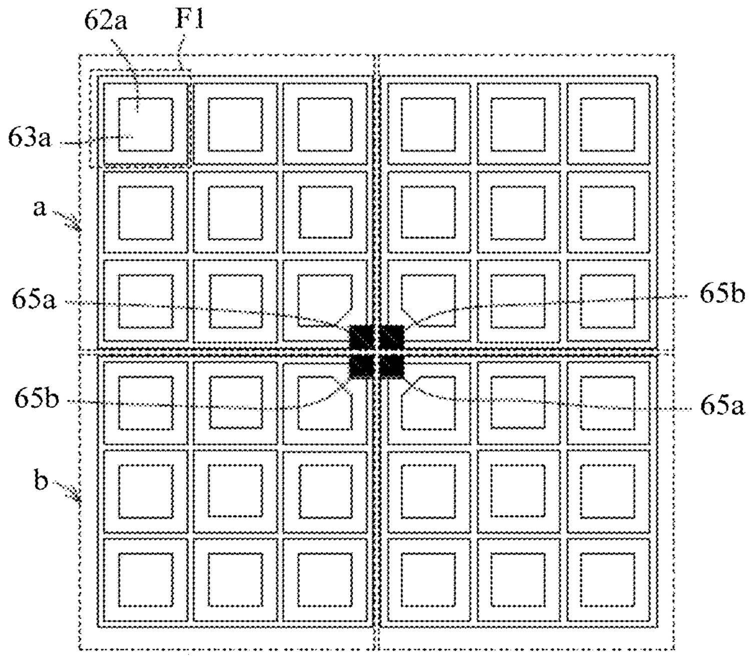
FIG. 8 is another example schematic diagram of a first antenna in an antenna array according to an embodiment of this application.

In addition, FIG. 8 shows a variation of the first antenna 60 shown in FIG. 7*a*. For example, a ratio of the operating frequency of the first antenna 60 to the operating frequency of the second antenna 50 in FIG. 8 is approximately 1:6. Each radiation part a includes nine frequency selection units F1, and the nine frequency selection units F1 are arranged in a 3×3 array. A length of one side of the conductive grid 62*a* in the frequency selection unit F1 is slightly smaller than 0.083 times a vacuum wavelength corresponding to an operating band of the first antenna 60 (for example, a length of one side of the conductive grid 62*a* in the frequency selection unit F1 is 0.070, 0.075, 0.080, or 0.083 times a vacuum wavelength corresponding to an operating band of the first antenna 60), and approximately equal to 0.50 times (for example, a length of one side of the conductive grid 62*a* in the frequency selection unit F1 is 0.4 times, 0.45 times, 0.50 times, 0.55 times, or 0.60 times a vacuum wavelength corresponding to an operating band of the second antenna 50) of the vacuum wavelength corresponding to the operating band of the second antenna 50 (that is, a frequency band corresponding to the high-frequency signal radiated from the second antenna 50).

By analogy, one or more frequency selection units F1 in each radiation part a are arranged in an n×n array, where n is a positive integer greater than or equal to 1.

Figure 9A:
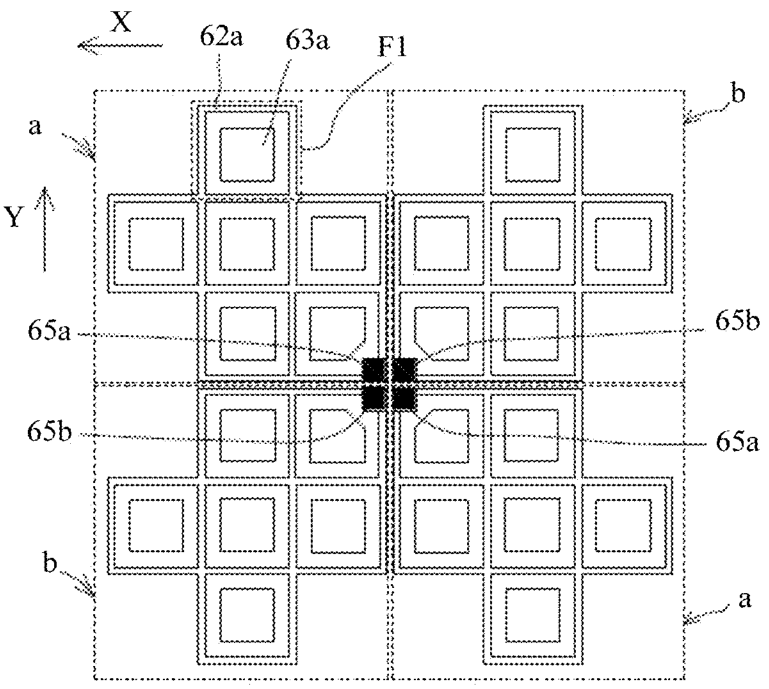
FIG. 9*a* is another example schematic diagram of a first antenna in an antenna array according to an embodiment of this application.
Figure 9B:
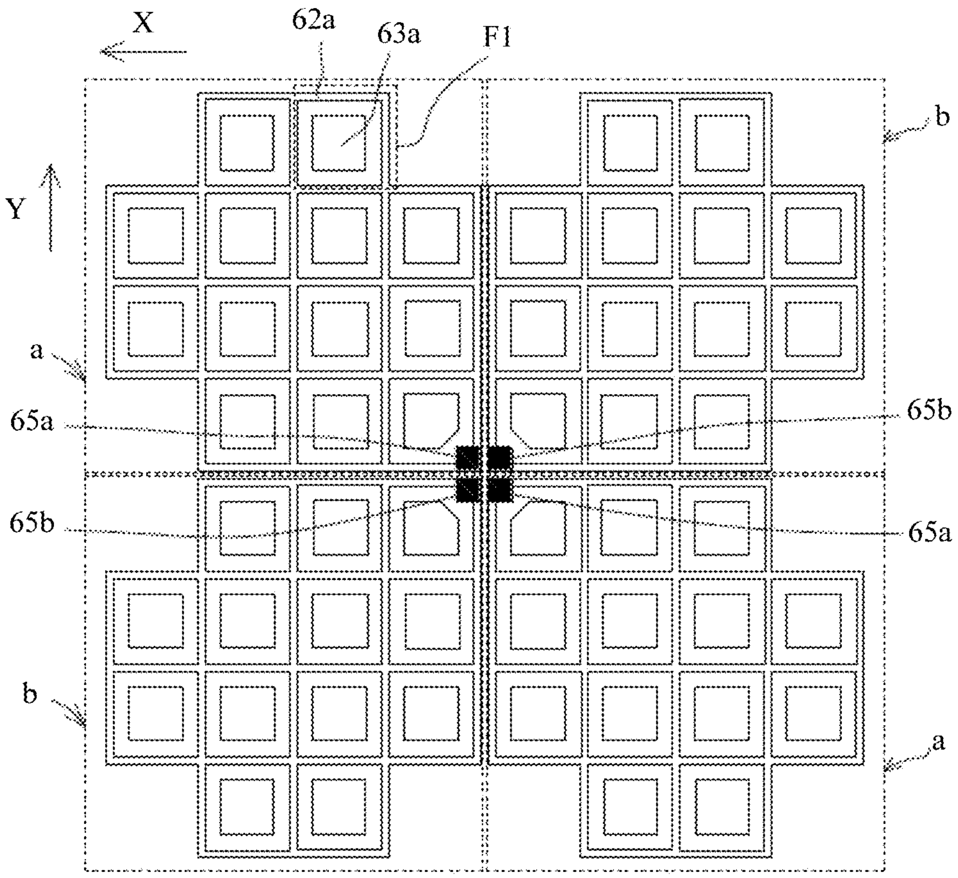
FIG. 9*b* is another example schematic diagram of a first antenna in an antenna array according to an embodiment of this application.

The frequency selection units F1 in the radiation part a of the first antenna described above are all arranged in an array mode, which are merely some of example implementations. In addition, the plurality of frequency selection units F1 may alternatively be arranged in a non-array mode, to meet a pattern indicator requirement of the first antenna 60 in some cases. FIG. 9*a* shows a variation of the first antenna 60 shown in FIG. 7*a*. In FIG. 9*a*, a radiation part a on the upper left side of FIG. 9*a* is used as an example, where an X direction is a column arrangement direction (that is, a row direction) of each frequency selection unit F1, a Y direction is a row arrangement direction (that is, a column direction) of each frequency selection unit F1. One radiation part a includes six frequency selection units F1, and six conductive grids 62*a* included in these six frequency selection units F1 form a grid structure, where four frequency selection units F1 are arranged in a 2×2 array, and conductive grids 62*a* included in all of the four frequency selection units are electrically connected to form a first conductive grid group. A metal solder joint 65*a* is arranged in a conductive grid 62*a* in row 1 and column 1. One frequency selection unit F1 is arranged on one side of a frequency selection unit F1 in row 2 and column 2 in the X direction, to form a second conductive grid group. The remaining frequency selection unit F1 is arranged on one side of a frequency selection unit F1 in row 2 and column 2 in the Y direction, to form a third conductive grid group. Every two adjacent conductive grids 62*a* are electrically connected. FIG. 9*b* shows a variation of the first antenna 60 shown in FIG. 9*a*. A radiation part a on the upper left side of FIG. 9*b* is used as an example. One radiation part a includes 13 frequency selection units F1, and 13 conductive grids 62*a* included in these 13 frequency selection units F1 form a grid structure, where nine frequency selection units F1 are arranged in a 3×3 array, and conductive grids 62*a* included in all of the nine frequency selection units are electrically connected to form a first conductive grid group. A metal solder joint 65*a* is arranged in a conductive grid 62*a* in row 1 and column 1. Two frequency selection units F1 are sequentially arranged on one side of a frequency selection unit F1 at third column second row and one side of a frequency selection unit F1 in column 3 and row 2 and one side of a frequency selection unit F1 in column 3 and row 3 in the X direction, and conductive grids 62*a* included in the two frequency selection units F1 form a second conductive grid group. The last two frequency selection units F1 are sequentially arranged on one side of a frequency selection unit F1 in row 3 and column 2 and one side of a frequency selection unit F1 in row 3 and column 3 in the Y direction, and two conductive grids 62*a* included in the two frequency selection units F1 form a third conductive grid group. Every two adjacent conductive grids 62*a* are electrically connected. By analogy, it can be concluded that the grid structure includes the first conductive grid group, the second conductive grid group, and the third conductive grid group. The first conductive grid group includes a plurality of conductive grids 62*a*, the plurality of conductive grids 62*a* are arranged in a n×n array, and the metal solder joint 65*a* is coupled to a conductive grid 62*a* in row 1 and column 1 in the first conductive grid group. The second conductive grid group includes n−1 conductive grids arranged on a side of a conductive grid 62*a* in column n in the first conductive grid group away from a conductive grid 62*a* in column n−1 and correspondingly arranged opposite to conductive grids 62*a* in column n and from row 2 to row n in the first conductive grid group. The third conductive grid group includes n−1 conductive grids 62*a* arranged on a side of a conductive grid in column n in the first conductive grid group away from a conductive grid 62*a* in row n−1 and correspondingly arranged opposite to conductive grids 62*a* in row n and from column 2 to column n in the first conductive grid group, and every two adjacent conductive grids 62*a* are electrically connected, where n is a positive integer greater than or equal to 2. The arrangement of the foregoing frequency selection units F1 can optimize the pattern indicators of the first antenna 60 in some cases.

Figure 10:
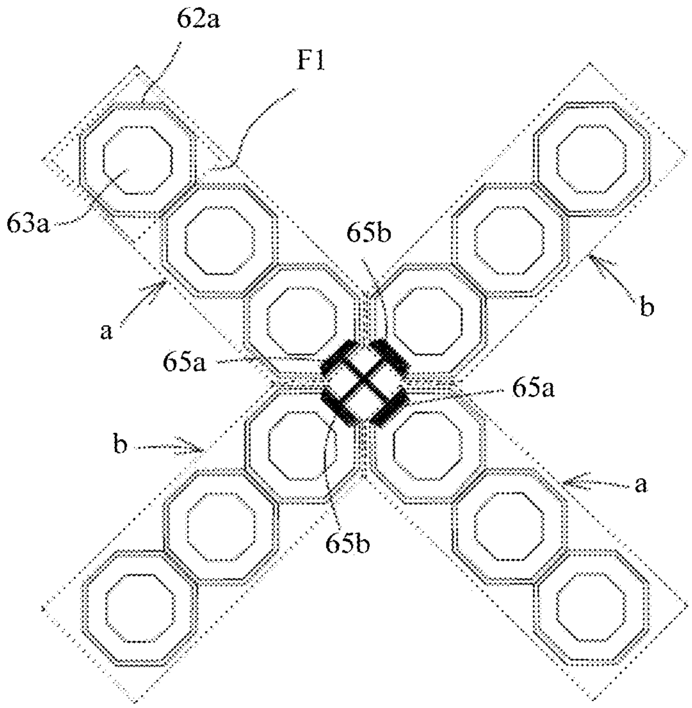
FIG. 10 is another example schematic diagram of a first antenna in an antenna array according to an embodiment of this application.

In another implementation of the first antenna 60, FIG. 10 is another schematic diagram of the first antenna 60. As shown in FIG. 10, compared with FIG. 7*a*, the arrangement of the frequency selection units F1 included in the radiation part a is changed to a linear arrangement. In FIG. 10, one radiation part a includes a plurality of (only three in FIG. 10 as an example) frequency selection units F1 distributed in a straight line, each frequency selection unit F1 includes a conductive grid 62*a* and a conductor 63*a* located in the conductive grid 62*a*, and every two adjacent conductive grids 62*a* are electrically connected. In FIG. 10, shapes of the conductive grid 62*a* and the conductor 63*a* in the frequency selection unit F1 are no longer squares, but regular octagons. The geometric center of the conductive grid 62*a* coincides with the geometric center of the conductor 63*a* therein, and sides of the conductive grid 62*a* are correspondingly parallel to sides of the conductor 63*a* therein, so that a width of a gap between the conductive grid 62*a* and the conductor 63*a* therein is even. For example, a ratio of an operating frequency of the first antenna 60 to an operating frequency of the second antenna 50 in FIG. 10 is approximately 1:6.25, and a length of one side of the conductive grid 62*a* in the frequency selection unit F1 is slightly less than 0.080 times a vacuum wavelength corresponding to an operating band of the first antenna 60 (for example, a length of one side of the conductive grid 62*a* in the frequency selection unit F1 is 0.075 times, 0.078 times, 0.080 times, or 0.082 times a vacuum wavelength corresponding to an operating band of the first antenna 60) and approximately equal to 0.50 times a vacuum wavelength corresponding to an operating band of the second antenna 50 (for example, a length of one side of the conductive grid 62*a* in the frequency selection unit F1 is 0.40 times, 0.45 times, 0.50 times, 0.55 times, or 0.60 times a vacuum wavelength corresponding to an operating band of the second antenna 50).

It should be noted that in FIG. 4*b*, similar to FIG. 10, the shape of the conductive grid 62*a* is the same as that of the outer contour (the "outer contour" of the conductor 63*a* refers to an outer edge of an orthographic projection of the conductor 63*a* on the top surface of the dielectric substrate 64*a*, for example, a thicker black line around the conductor 63*a* in FIG. 4*c* is the outer contour of the conductor 63*a*) of the conductor 63*a* located in the conductive grid 62*a*. To be specific, in FIG. 4*b*, the conductive grid 62*a* and the outer contours of the conductor 63*a* therein are both square, the geometric center of the conductive grid 62*a* coincides with the geometric center of the conductor 63*a* therein, and each side of the conductive grid 62*a* is parallel to the edge of the conductor 63*a* in a one-to-one correspondence. This arrangement enables the width of the gap between the conductive grid 62*a* and the conductor 63*a* to be even, and avoids an excessive current somewhere. Similarly, the conductive grid 62*a* and the conductor 63*a* are also allowed to have segmental arcs. For example, the conductive grid 62*a* is circular, the conductor 63*a* is also circular, and centers of the two coincide. This can also ensure that the width of the gap between the conductive grid 62*a* and the conductor 63*a* is even. Shapes of the outer contours of the conductors 63*a* in the foregoing conductive grid 62*a* are the same, each side of the conductive grid 62*a* is arranged in opposite to the corresponding edge of the conductor 63*a*, and a form that the geometric center of the conductive grid 62*a* coincides with the geometric center of the conductor 63*a* therein means that the shape of the conductive grid 62*a* matches the shape of the conductor 63*a*, so that the width of the gap between the conductive grid 62*a* and the conductor 63*a* is even.

In addition, in FIG. 4*b*, FIG. 7*a*, FIG. 8, FIG. 9*a*, and FIG. 9*b*, all of the conductive grids (for example, the conductive grid 62*a* and the conductive grid 62*b*) are square, to facilitate arrangement of the radiation part of the planar structure, and all the radiation parts (the radiation part a and the radiation part b) are wholly symmetric with respect to the horizontal axis, the vertical axis, the +45 degree polarization axis, and the −45 degree polarization axis, to meet requirements of ±45° dual polarization dipoles. In addition to the square shape, the conductive grid 62*a* of a regular triangle shape, a regular hexagon shape and the like may also meet the foregoing requirement. That is, the conductive grid 62*a* is in a regular polygon shape, and a degree of an inner angle of the conductive grid 62*a* is a divisor of 360° (for example, a degree of each inner angle of the regular triangle is 60°, the inner angle degree of 60° is a divisor of 360°, and inner angles of six regular triangles can be joined together to form a 360° circumferential angle; or a degree of each inner angle of a regular hexagon is 120°, the internal angle degree of 120° is a divisor of 360°, and internal angles of three regular hexagons can be joined together to form a 360° circumferential angle). In this way, the conductive grids 62*a* can be seamlessly joined into an integral planar structure (relative to the conductive grids 62*a* in FIG. 10 that are arranged in a straight line), and can meet the requirements of the ±45° dual polarization dipoles.

In the foregoing frequency selection unit F1, shapes of the conductive grid 62*a* and the conductor 63*a* are merely examples. For example, the conductive grid 62*a* and the conductor 63*a* may alternatively be in rhombus, rectangle, triangle, or other shapes, provided that the feeding part is coupled to the conductive grid 62*a* (when the radiation part a includes only one conductive grid 62*a*) or an outer frame of a grid structure formed by electrically connected conductive grids 62*a* (when the radiation part a includes a plurality of conductive grids 62*a*).

In addition, all the radiation parts b of the first antenna 60 in the foregoing embodiments have similar settings to the radiation part a, but it should be noted that the radiation part b may alternatively be set differently from the radiation part a, provided that the two radiation parts a and the two radiation parts b are wholly symmetric with respect to a horizontal axis, a vertical axis, a +45° polarization axis, and a −45° polarization axis.

The first antenna 60 and the second antenna 50 may be other types of antennas besides the ±45° dual polarization dipole antennas. For example, the first antenna 60 and the second antenna 50 are monopole antennas, dipole antennas, vertical and horizontal dual-polarization antennas, or other types of antennas, and the first antenna 60 and the second antenna 50 are not necessarily the same type of antenna, provided that the first antenna 60 has a structure of the radiation part a. When the first antenna 60 is a non-dual-polarization antenna such as a monopole antenna or a dipole antenna, if the radiation part of the first antenna 60 includes a plurality of frequency selection units, when the conductive grids included in these frequency selection units are electrically connected to each other to form the grid structure including the conductive grids 62*a* shown in FIG. 7*a*, the feeding part is allowed to be coupled to the side frame shared by the two conductive grids for feeding.

In addition, the foregoing only describes the case in which there is only one first antenna 60 and a plurality of second antennas 50. Actually, there may be a plurality of first antennas 60 and one second antenna 50, or a plurality of first antennas 60 and a plurality of second antennas 50.

In addition, in addition to the frequency selection units, the first antenna 60 may also have a structure that can generate, when the high-frequency signal radiated from the second antenna 50 passes through, coupling currents that are canceled in pairs, without deteriorating the pattern parameters such as the polarization suppression ratio and the gain stability of the first antenna 60. This is not described herein again.

As shown in FIG. 4*a* to FIG. 10, this embodiment of this application further discloses an antenna. The antenna has the structure of the first antenna 60 in the foregoing antenna array. The antenna works with an appropriate higher-frequency antenna (for example, the second antenna 50 in the foregoing embodiment), so that a frequency selection unit (for example, a frequency selection unit F1) in the first antenna 60 has a bandpass characteristic to an operating frequency of the second antenna 50, to enhance a transmission capability of a high-frequency signal radiated from the second antenna 50. An induced current on a conductive grid (for example, a conductive grid 62*a*) of a radiation part (for example, a radiation part a) of the first antenna 60 that is excited by an electromagnetic wave radiated from the second antenna 50 and an induced current on a corresponding conductor (for example, a conductor 63*a*) that is excited by an electromagnetic wave radiated from the second antenna 50 can at least partially cancel each other. Therefore, the first antenna 60 reduces or even completely eliminates electromagnetic waves with the same frequency as the second antenna 50 that are radiated outward, finally optimizing pattern parameters such as a polarization suppression ratio and gain stability of the second antenna 50.

An embodiment of this application further discloses a communications device. The communications device includes the foregoing antenna array. The communications device may be a base station, a radar, or another device. The antenna array includes at least one first antenna 60 described in the foregoing embodiments and at least one second antenna 50 described in the foregoing embodiments, and a frequency selection unit (for example, a frequency selection unit F1) in the first antenna 60 has a bandpass characteristic to an operating frequency of the second antenna 50, to enhance a transmission capability of an electromagnetic wave radiated from the second antenna 50. In addition, an induced current on a conductive grid (for example, a conductive grid 62*a*) of a radiation part (for example, a radiation part a) of the first antenna 60 that is excited by an electromagnetic wave radiated from the second antenna 50 and an induced current on a corresponding conductor (for example, a conductor 63*a*) that is excited by an electromagnetic wave radiated from the second antenna 50 can at least partially cancel each other. Therefore, the first antenna 60 reduces or even completely eliminates electromagnetic waves with the same frequency as the second antenna 50 that are radiated outward, finally optimizing pattern parameters such as a polarization suppression ratio and gain stability of the second antenna 50.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna, comprising:

a radiation part including one or more frequency selection units, each frequency selection unit having a bandpass characteristic, wherein each of the one or more frequency selection units comprises a conductive grid and a conductor located in the conductive grid, and wherein the conductor and the corresponding conductive grid are electrically coupled with a gap in between, so that the corresponding frequency selection unit has the bandpass characteristic; and a feeding part, wherein the feeding part is coupled to the radiation part, and is configured to feed power to the radiation part; and wherein the radiation part is to excite coupling currents that appear in a plurality of pairs when a high-frequency signal passes through, wherein each pair of coupling currents cancels each other, and wherein every two pairs of coupling currents excited on the radiation part are formed in one of the one or more frequency selection units, wherein in each pair of coupling currents, one current is formed in the conductor of the frequency selection unit, and the other current is formed in the conductive grid of the frequency selection unit.

2. The antenna according to claim 1, wherein the feeding part is coupled to an outer side of the conductive grid in each of the one or more frequency selection units, and is configured to feed power to the conductive grid.

3. The antenna according to claim 1, wherein a width of a frame of the conductive grid is greater than or equal to 0.001 times a vacuum wavelength corresponding to a frequency of the high-frequency signal and less than or equal to 0.1 times the vacuum wavelength corresponding to the frequency of the high-frequency signal.

4. The antenna according to claim 1, wherein a width of the gap between the conductive grid and the corresponding conductor is greater than or equal to 0.001 times a vacuum wavelength corresponding to a frequency of the high-frequency signal and less than or equal to 0.1 times the vacuum wavelength corresponding to the frequency of the high-frequency signal.

5. The antenna according to claim 1, wherein the conductor comprises a plurality of sub-conductors arranged at an interval; and a width of a gap between every two adjacent sub-conductors is greater than or equal to 0.001 times a vacuum wavelength corresponding to a frequency of the high-frequency signal and less than or equal to 0.1 times the vacuum wavelength corresponding to the frequency of the high-frequency signal.

6. The antenna according to claim 5, wherein the width of the gap between every two adjacent sub-conductors is greater than or equal to 0.0025 times the vacuum wavelength corresponding to the frequency of the high-frequency signal and less than or equal to 0.05 times the vacuum wavelength corresponding to the frequency of the high-frequency signal.

7. The antenna according to claim 5, wherein the radiation part further comprises a conductor connecting part; and in at least some of the sub-conductors, a part of a side of each sub-conductor is electrically connected to a frame of the conductive grid through the conductor connecting part.

8. The antenna according to claim 7, wherein a width of a part connecting the side of the sub-conductor and the conductor connecting part is greater than or equal to 0.001 times the vacuum wavelength corresponding to the frequency of the high-frequency signal and less than or equal to 0.1 times the vacuum wavelength corresponding to the frequency of the high-frequency signal.

9. The antenna according to claim 1, wherein a shape of the conductive grid matches a shape of an outer contour of the corresponding conductor, so that a width of the gap between the conductive grid and the corresponding conductor is even.

10. The antenna according to claim 9, wherein the antenna is a ±45° dual polarization dipole antenna.

11. The antenna according to claim 10, wherein each of the conductive grids is a regular polygon with 3 or more sides, and a degree of each internal angle of the regular polygon is a divisor of 360°.

12. The antenna according to claim 11, wherein in each radiation part, a shape of each conductive grid is square, and one or more conductive grids located in each radiation part are arranged in an n×n array, wherein n is a positive integer greater than or equal to 1.

13. The antenna according to claim 12, wherein the antenna further comprises a dielectric substrate, and the conductive grid and the conductor are both metal foil structures formed on a surface of the dielectric substrate.

14. The antenna according to claim 13, wherein the dielectric substrate is a bakelite plate, a fiberglass board, or a plastic plate.

15. An antenna array, comprising:

a first antenna; and a second antenna;

wherein the first antenna comprises:

a radiation part including one or more frequency selection units, each frequency selection unit having a bandpass characteristic, wherein each of the one or more frequency selection units comprises a conductive grid and a conductor located in the conductive grid, wherein the conductor and the corresponding conductive grid are electrically coupled with a gap in between, so that the corresponding frequency selection unit has the bandpass characteristic, a feeding part, wherein the feeding part is coupled to the radiation part, and is configured to feed power to the radiation part, and wherein the radiation part is to excite coupling currents that appear in a plurality of pairs when a high-frequency signal passes through, wherein each pair of coupling currents cancels each other;

where an operating frequency of the second antenna is a frequency of the high-frequency signal, an operating frequency of the first antenna is lower than the operating frequency of the second antenna, and a frequency selection unit in the first antenna has a bandpass characteristic to the operating frequency of the second antenna, and wherein every two pairs of coupling currents excited on the radiation part are formed in one of the one or more frequency selection units, wherein in each pair of coupling currents, one current is formed in the conductor of the frequency selection unit, and the other current is formed in the conductive grid of the frequency selection unit.

16. The antenna array according to claim 15, wherein a minimum distance between a radiation part of the first antenna and at least a part of a radiation part of the second antenna is less than or equal to 0.5 times a vacuum wavelength corresponding to an operating band of the first antenna.

17. A communications device, comprising:

an antenna array, wherein the antenna array comprises:

at first antenna; and at second antenna;

wherein at least one of first antenna or the second antenna comprises:

a radiation part including one or more frequency selection units, each frequency selection unit having a bandpass characteristic, wherein each of the one or more frequency selection units comprises a conductive grid and a conductor located in the conductive grid, wherein the conductor and the corresponding conductive grid are electrically coupled with a gap in between, so that the corresponding frequency selection unit has the bandpass characteristic, a feeding part, wherein the feeding part is coupled to the radiation part, and is configured to feed power to the radiation part, and wherein the radiation part is to excite coupling currents that appear in a plurality of pairs when a high-frequency signal passes through, wherein each pair of coupling currents cancels each other, wherein every two pairs of coupling currents excited on the radiation part are formed in one of the one or more frequency selection units, wherein in each pair of coupling currents, one current is formed in the conductor of the frequency selection unit, and the other current is formed in the conductive grid of the frequency selection unit;

where an operating frequency of the second antenna is a frequency of the high-frequency signal, an operating frequency of the first antenna is lower than the operating frequency of the second antenna, and a frequency selection unit in the first antenna has a bandpass characteristic to the operating frequency of the second antenna.

18. The communication device of claim 17, wherein the feeding part is coupled to an outer side of the conductive grid in each of the one or more frequency selection units, and is configured to feed power to the conductive grid.

19. The communication device of claim 17, wherein a width of a frame of the conductive grid is greater than or equal to 0.001 times a vacuum wavelength corresponding to a frequency of the high-frequency signal and less than or equal to 0.1 times the vacuum wavelength corresponding to the frequency of the high-frequency signal.

20. The communication device of claim 17, wherein a width of the gap between the conductive grid and the corresponding conductor is greater than or equal to 0.001 times a vacuum wavelength corresponding to a frequency of the high-frequency signal and less than or equal to 0.1 times the vacuum wavelength corresponding to the frequency of the high-frequency signal.

* * * * *